(12) United States Patent
Mohamed et al.

(10) Patent No.: US 10,334,392 B2
(45) Date of Patent: Jun. 25, 2019

(54) LOCATION-BASED CONTEXT DELIVERY

(71) Applicant: Convida Wireless, LLC, Wilmington, DE (US)

(72) Inventors: Ahmed Mohamed, Pembroke Pines, FL (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/738,839

(22) PCT Filed: Jun. 29, 2016

(86) PCT No.: PCT/US2016/040021
§ 371 (c)(1),
(2) Date: Dec. 21, 2017

(87) PCT Pub. No.: WO2017/004158
PCT Pub. Date: Jan. 5, 2017

(65) Prior Publication Data
US 2018/0192234 A1   Jul. 5, 2018

Related U.S. Application Data

(60) Provisional application No. 62/186,018, filed on Jun. 29, 2015.

(51) Int. Cl.
*H04W 4/02* (2018.01)
*H04W 8/18* (2009.01)
(Continued)

(52) U.S. Cl.
CPC .............. *H04W 4/02* (2013.01); *H04L 67/18* (2013.01); *H04W 8/18* (2013.01); *H04W 4/70* (2018.02); *H04W 8/10* (2013.01); *H04W 8/12* (2013.01)

(58) Field of Classification Search
CPC .......... H04W 4/70; H04W 4/02; H04W 8/10; H04W 8/12; H04W 8/18; H04W 92/04;
(Continued)

(56) References Cited

U.S. PATENT DOCUMENTS 9,888,353 B2 * 2/2018 Reed ..................... H04W 8/02
9,918,196 B2 * 3/2018 Reed ..................... H04W 8/02
(Continued)

FOREIGN PATENT DOCUMENTS

JP    2010-041101 A    2/2010
JP    2011-217058 A    10/2011

OTHER PUBLICATIONS

"3rd Generation Partnership Project; Technical Specification Group Services and System Aspects; Architecture enhancements to facilitate communications with packet data networks and applications (Release 13)", 3GPP Standard; 3GPP TS 23.682, 3rd Generation Partnership Project (3GPP), Mobile Competence Centre 650, Route Des Lucioles ; F-06921 Sophia-A.*
(Continued)

*Primary Examiner* — Nathan S Taylor
(74) *Attorney, Agent, or Firm* — BakerHostetler

(57) ABSTRACT

An enhanced 3GPP network architecture can enables a SCEF to interact with SCS/AS via APIs that provide location based context; GMLC to get the UE's location, available RATs, and congestion levels; HSS to get the UE's location, available RATs, and congestion levels; PCEF (via PCRF) to obtain the congestion level at the P-GW; RCAF (via PCRF) to obtain the user plane congestion levels at the E-UTRAN, UTRAN, and WLAN; and serving nodes (MME, SGSN, 3GPP AAA Server) to get the available RATs and congestion levels.

11 Claims, 17 Drawing Sheets

(51) Int. Cl.
  *H04L 29/08* (2006.01)
  *H04W 8/10* (2009.01)
  *H04W 8/12* (2009.01)
  *H04W 4/70* (2018.01)

(58) Field of Classification Search
  CPC ..... H04W 48/18; H04W 4/023; H04W 4/025; H04W 64/00; H04W 28/0226; H04W 28/0263; H04W 28/0284; H04W 36/14; H04W 36/245; H04W 48/04; H04W 48/06; H04W 4/001; H04W 4/12; H04W 4/50
  USPC ............. 370/329, 331; 455/433, 456.1, 509; 709/206
  See application file for complete search history.

(56) References Cited

U.S. PATENT DOCUMENTS

| | | | | |
|---|---|---|---|---|
| 2004/0192299 | A1* | 9/2004 | Wilson | H04W 64/00 455/433 |
| 2012/0214527 | A1* | 8/2012 | Meylan | H04L 69/32 455/509 |
| 2012/0226757 | A1* | 9/2012 | McFarland | H04W 4/023 709/206 |
| 2015/0110007 | A1* | 4/2015 | Tervo | H04W 4/001 370/329 |
| 2015/0382262 | A1* | 12/2015 | Cho | H04W 4/02 370/331 |
| 2016/0269929 | A1* | 9/2016 | Livanos | H04W 28/0289 |
| 2016/0353245 | A1* | 12/2016 | Kulikov | G06Q 30/02 |
| 2017/0150395 | A1* | 5/2017 | Karlsson | H04W 28/0284 |
| 2017/0251342 | A1* | 8/2017 | Bhalla | H04W 4/08 |
| 2017/0332421 | A1* | 11/2017 | Sternberg | H04W 76/11 |
| 2018/0007514 | A1* | 1/2018 | Dicke | H04W 4/02 |

OTHER PUBLICATIONS

Third Generation Partnership Project (3GPP), 3GPP TS 43.059 v12.0.0, Technical Specification Group GSM/EDGE Radio Access Network; Functional Stage 2 Description of Location Services (LCS) in GERAN, Release 12, Feb. 2014, 69 pages.
Third Generation Partnership Project (3GPP), 3GPP TS 29.405 v13.0.0, Technical Specification Group Core Network and Terminals; Nq and Nq' Application Protocol (Nq-Ap); Stage 3, Release 13, Jun. 2015, 20 pages.
Third Generation Partnership Project (3GPP), 3GPP TS 29.273 v13.0.0, Technical Specification Group Core Network and Terminals; Evolved Packet System (EPS); 3GPP EPS AAA interfaces, Release 13, Jun. 2015, 162 pages.
Third Generation Partnership Project (3GPP), 3GPP TS 29.272 v12.6.0, Technical Specification Group Core Network and Terminals; Evolved Packet System (EPS); Mobility Management Entity (MME) and Serving GPRS Support Node (SGSN) related interfaces based on Diameter protocol, Release 12, Sep. 2014, 134 pages.
Third Generation Partnership Project (3GPP), 3GPP TS 29.217 v2.2.0., Technical Specification Group Core Network and Terminals; Policy and Charging Control: Congestion Reporting over Np reference point, Release 13, Jun. 2015, 23 pages.
Third Generation Partnership Project (3GPP), 3GPP TS 29.214 v13.1.0, Technical Specification Group Core Network and Terminals; Policy and Charging Control Over Rx Reference Point, Release 13, Mar. 2015, 64 pages.
Third Generation Partnership Project (3GPP), 3GPP TS 29.212 v12.4.0, Technical Specification Group Core Network and Terminals; Policy and Charging Control (PCC); Release points, Release 12, Mar. 2014, 220 pages.
Third Generation Partnership Project (3GPP), 3GPP TS 29.198 v3.4.0, Technical Specification Group Core Network; Open Service Architecture (OSA), Application Programming Interface (API)—Part 1, Release 1999, Jun. 2001, 166 pages.
Third Generation Partnership Project (3GPP), 3GPP TS 29.173 v12.3.0, Technical Specification Group Core Network and Terminals; Location Services (LCS); Diameter-based SLH Interface for Control Plane LCS, Release 12, Mar. 2015, 19 pages.
Third Generation Partnership Project (3GPP), 3GPP TS 29.172 v12.5.0, Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface, Release 12, Mar. 2015, 38 pages.
Third Generation Partnership Project (3GPP), 3GPP TS 25.305 v12.1.0, Technical Specification Group Radio Access Network; Stage 2 Functional Specification of User Equipment (UE) Positioning in UTRAN, Release 12, Dec. 2014, 81 pages.
Third Generation Partnership Project (3GPP), 3GPP TS 23.402 v12A.0, Technical Specification Group Services and System Aspects; Architecture Enhancements for non-3GPP Accesses, Release 12, Mar. 2014, 288 pages.
Third Generation Partnership Project (3GPP), 3GPP TS 23.401 v12A.0, Technical Specification Group Services and System Aspects; General Packet Radio Services (GPRS) Enhancements for Evolved Universal Terrestrial Radio Access Network (E-UTRAN) access, Release 12, Mar. 2014, 302 pages.
Third Generation Partnership Project (3GPP), 3GPP TS 23.271 v12.0.0, Technical Specification Group Services and System Aspects; Functional Stage 2 description of Location Services (LCS), Release 12, Dec. 2013, 169 pages.
Third Generation Partnership Project (3GPP), 3GPP TS 23.203 v12.4.0, Technical Specification Group Services and System Aspects; Policy and Charging Control Architecture, Release 12, Mar. 2014, 218 pages.
Third Generation Partnership Project (3GPP), 3GPP TS 23.060 v13.3.0, Technical Specification Group Services and System Aspects; General Packet Radio Services (GPRS); Service Description; Stage 2, Release 13, Jun. 2015, 358 pages.
Third Generation Partnership Project (3GPP), 3GPP TS 23.008 v13.1.0, Technical Specification Group Core Network and Terminals; Organization of Subscriber Data, Release 13, Jun. 2015, 109 pages.
Third Generation Partnership Project (3GPP), 3GPP TS 23.003 v12.4.1, Technical Specification Group Core Network and Terminals; Numbering, Addressing and Identification, Release 12, Oct. 2014, 90 pages.
Third Generation Partnership Project (3GPP), 3GPP TS 23.002 v13.2.0, Technical Specification Group Services and System Aspects; Network Architecture, Release 13, Jun. 2015, 110 pages.
Third Generation Partnership Project (3GPP), 3GPP TR 23.769 v13.0.0, Technical Specification Group Services and System Aspects; Group Based Enhancements, Release 13, Jun. 2015, 38 pages.
OneM2M-TS-0001-V-2014-08, oneM2M Functional Architecture Baseline, Technical Specification, Aug. 1, 2014, 297 pages.
OMA MLP TS, "Mobile Location Protocol 33", Open Mobile Alliance, OMA-TS-MLP-V3_3-20091001-C, Oct. 1, 2009, 134 pages.
3rd Generation Partnership Project 3GPP; TR 23.708, Technical Specification Group Services and System Aspects; Architecture Enhancements for Service Capability Exposure (Release 13), SA WG2, No. V13.0.0, Jun. 21, 2015, 31 Pages.

* cited by examiner

LOCATION-BASED CONTEXT DELIVERY

CROSS-REFERENCE TO RELATED APPLICATIONS

This Application is a National Stage Application filed under 35 U.S.C. § 371 of International Application No. PCT/US2016/040021 filed Jun. 29, 2016, which claims the benefit of U.S. Provisional Patent Application Ser. No. 62/186,018, filed Jun. 29, 2015, the disclosure of which is hereby incorporated by reference as if set forth in its entirety.

BACKGROUND

Machine to Machine (M2M) concerns technologies that allow both wireless and wired systems to communicate with other devices. M2M is considered an integral part of the Internet of Things (IoT) and has a wide range of applications such as industrial automation, logistics, Smart Grid, Smart Cities, health, defense etc. mostly for monitoring but also for control purposes.

M2M can play an important role in Location Based Services (LBS) applications. Some M2M examples of LBS include locating assets, such as for inventory; applying rules that depend on location, such as checking that a container is not opened until it is at its destination; tracking assets for billing purposes, such as for usage-based insurance; and finding assets within a given area, such as to locate the nearest truck for an urgent pick-up Of particular interest is wireless asset tracking, which is about knowing location information (where, status of asset, change) and taking action based on the location information (Take Action, Inform, Aid, Support). Assets can be fixed (e.g. vending system) or mobile (goods in transit).

There has been interest in location information in multiple standards bodies such as oneM2M, OMA, and 3GPP. In the following, the perspective and contribution of each standard body towards the location requirements and solutions is described.

It is intended that the oneM2M Location (LOC) Common Service Function (CSF) 102 allows Application Entities (AEs) 104 to obtain geographical location information of Nodes (e.g. mobile node) for LBS as indicated in oneM2M TS 0001. The LOC CSF 102 may interact with the location server in the underlying network. The geographical location information can include more than simply the longitude and the latitude information.

Open Mobile Alliance (OMA) API provides "Terminal location" Application Program Interface (API) for terminal location, distance, or terminal movements in relation to a circular geographic area (crossing in and out of circular area). More precisely, the "Terminal location" API supports the following operations; obtain the current terminal location; obtain the terminal distance from a given location; obtain the distance between two terminals; and manage client-specific subscriptions to periodic notifications; Manage client-specific subscriptions to area (circle) notifications; Manage client-specific subscriptions to distance notifications.

The Functional stage 2 description of Location Services (LCS) is included in TS 23.271. As indicated in clause 6 of TS 23.271, FIG. 2 "shows the general arrangement of the Location Service feature in GSM, UMTS and EPS. This illustrates, generally, the relation of LCS Clients and servers in the core network with GERAN, UTRAN and E-UTRAN Access Networks. The LCS entities within the Access Network communicate with the Core Network across the A, Gb, Iu and S1 interfaces. Communication among the Access Network LCS entities makes use of the messaging and signaling capabilities of the Access Network."

As for the Gateway Mobile Location Center (GMLC) 302 and as indicated in clause 6.3.3 of TS 23.271, "the GMLC is the first node an external LCS client accesses in a PLMN (i.e. the Le reference point is supported by the GMLC). The GMLC may request routing information from the Home Location Register (HLR) via the Lh interface or HSS via the SLh/Lh interface. Note 1 in FIG. 2 indicates that the HSS includes both 2G-HLR and 3G-HLR functionality. After performing registration authorization, it sends positioning requests to either visited Mobile Switching Center (MSC) (2G-MSC), SGSN, MSC Server or MME and receives final location estimates from the corresponding entity via the Lg, Lgd or SLg interface." The reference points of the GMLC are indicated in FIG. 3 (TS 29.173).

The GMLC 302 provides only location estimates, as stated above. In other words, it does not provide any other context information such as the available Radio Access Technology (RAT) or the congestion level at any of the serving nodes (e.g. MME 306).

As indicated above, the GMLC 302 sends the location request to the MME 306/SGSN 308 to inquire about the UE's location. Once done, the MME 306/SGSN 308 communicates with the UE 202 to check if it is still attached and to get its current location. The specific behaviors of MME 306 and SGSN 308 can be summarized as follows.

For E-UTRAN, the MME 306 checks if the UE 202 is detached or suspended and in either such case an error response is returned. If the UE 202 is in ECM-IDLE state, the MME 306 performs a "network triggered service request" as defined in TS 23.401 in order to establish a signalling connection with the UE 202 and assign a specific eNB. Then, the MME 306 sends a "Location Request" message to an Evolved Serving Mobile Location Center (E-SMLC). The E-SMLC 702 determines the positioning method and instigates the particular message sequence for this method, as described in clause 9.3a of TS 23.271. If the position method returns position measurements, the E-SMLC uses them to compute a location estimate. The E-SMLC 702 returns its location estimate to the MME 306 in a "Location Response" message. E-SMLC 702 in its response includes an indication whether the obtained location estimate satisfies the requested accuracy or not. If a location estimate could not be obtained, the E-SMLC 702 returns a Location Response message containing a failure cause and no location estimate. Finally, the MME 306 returns the location information, its age and obtained accuracy indication to the GMLC 302.

If the UE 202 is in idle mode, the SGSN 308 performs paging. The paging procedure is defined in TS 23.060. If no paging response is received, the SGSN 308 returns an error response to the GMLC. Otherwise, the SGSN 308 sends a "Location Request" message to the RAN 604 (UTRAN/GERAN). This message includes the type of location information requested, the requested QoS and any other location information received in paging response. Accordingly, the RAN 604 determines the positioning method and instigates the particular message sequence for this method in UTRAN Stage 2 TS 25.305 and in GERAN Stage 2 TS 43.059. The RAN 604 returns the location estimate to the SGSN 308 in a "Location Report" message. RAN 604 in its response includes an indication whether the obtained location estimate satisfies the requested accuracy or not. Finally, the SGSN 308 returns the location information, its age and obtained accuracy indication to the GMLC.

3GPP has recently defined a framework to better expose underlying 3GPP network capabilities to application/service providers, TS 23.682. In order to achieve this, 3GGP has defined a new function called a Service Capability Exposure Function (SCEF 404). This function provides a means to securely expose the services and capabilities provided by 3GPP networks. The SCEF 404 provides a means for the discovery of the exposed service capabilities. The SCEF 404 provides access to network capabilities through homogenous network application programming interfaces (e.g. Network API) defined by OMA, GSMA, and possibly other standardization bodies. The SCEF 404 abstracts the services from the underlying 3GPP network interfaces and protocols.

FIG. 4 is copied from TS 23.682. It shows a diagram of the SCEF's relationship with the applications and EPC. Although not shown in the figure, the GMLC 302 may be one of the Network Entities that can connect to the SCEF 404.

The number of Machine Type Communication (MTC) devices may be several orders of magnitude greater than "traditional" devices. Many (but not all) MTC devices will be relatively stationary and/or generate low volumes of traffic. However, these UEs will still be expected to generate the same volume of control signaling as a non-MTC UE 202. A higher volume of signaling due to an increase in the number of UEs may cause overload, independent of whether the UE 202 is used for MTC or not. Such overload can happen at the P-GW/GGSN, serving nodes (MME 306/ SGSN 308), or the radio access network (RAN). Hence generic functionality for overload and congestion control is required, as illustrated in TS 23.401 and TS 23.06.

The P-GW/GGSN can detect congestion on a per Access Point Name (APN) basis and reject Packet Data Protocol (PDP) context activation requests based on either:

1. The maximum number of active PDP contexts per APN
2. The maximum rate of PDP context activations per APN When the P-GW/GGSN rejects a PDP context activation request, the P-GW/GGSN may provide a back-off time for a specific APN to the MME 306/SGSN 308. The MME 306/SGSN 308 may try a different P-GW/GGSN before sending the rejection to the UE 202.

The MME 306 (SGSN 308) restricts the load that its eNodeBs (BSC/RNC) are generating on it, if it is configured to enable the overload restriction. Particularly, the MME 306 (SGSN 308) can request the eNodeB (BSC/RNC) to restrict the load from certain categories of MTC devices. In response, the eNodeB (RNC) may reject RRC connection requests and indicate to the UE 202 a back-off timer value to limit further RRC connection requests. The UE 202 can provide a low access priority indication to the MME 306/ SGSN 308 via NAS signaling. This will allow the MME 306/SGSN 308 to command the UE 202 to move to a state where it does not need to generate further signaling messages and/or does not reselect the PLMN.

As indicated in clause 4.4.12 of TS 23.401 (and clause 5.4.11 of TS 23.060 for UTRAN), the RAN Congestion Awareness Function (RCAF 504) collects information related to user plane congestion from the RAN's OAM system based on which the RCAF 504 determines the congestion level (and the identifier) of an eNB or E-UTRAN (UTRAN) cell. The RCAF 504 is included in the Policy and Charging Control (PCC) Architecture, as shown in FIG. 5 (copied from TS 23.203). Also, the RCAF 504 is assumed to serve a geographical area, as indicated in clause 6.1.15.3 of TS 23.203.

Via the Nq/Nq' interface, the RCAF 504 determines the UEs served by a congested eNB or congested E-UTRAN cell and retrieves the APNs of the active PDN connections of those UEs. A recent Rel-13 work item just started to define the application protocol over the Nq reference point (Nq-AP), and its results will be included in TS 29.405 Nq and Nq' Application Protocol (Nq-AP); Stage 3. Via the Np reference point, the RCAF 504 sends the RAN User Plane Congestion Information (RUCI) to the PCRFs serving the UEs' PDN connections. A recent Rel-13 TS 29.217 "Policy and Charging Control: Congestion Reporting over Np Reference Point" describes the Np messages and Diameter AVPs.

SUMMARY

The UE's location-based context can include its location, velocity, available RATs, and the congestion levels at these RATs. Other metrics can be included as well.

An enhanced 3GPP network architecture can enable an SCEF to interact with SCS/AS via APIs that provide location based context; GMLC to get the UE's location, available RATs, and congestion levels; HSS to get the UE's location, available RATs, and congestion levels; PCEF (via PCRF) to obtain the congestion level at the P-GW; RCAF (via PCRF) to obtain the user plane congestion levels at the E-UTRAN, UTRAN, and WLAN; and serving nodes (MME, SGSN, 3GPP AAA Server) to get the available RATs and congestion levels.

In a GMLC-based location context delivery procedure, the GMLC interacts with the serving nodes (MME/SGSN/ AAA Server) to inquire about the UE's context including the congestion level at the serving nodes and the available RATs to the UE.

In an HSS-based location context delivery procedure, the HSS interacts directly with the serving nodes, to inquire about the UE's location context.

In an SCEF-based location context delivery procedure, the SCEF interacts directly with the serving nodes, to inquire about the UE's location context. In doing so, the SCEF can communicate directly with the serving nodes, namely, MME, SGSN, and 3GPP AAA Server, over the T5a', T5b', and T5w', respectively.

In a PCRF-based location context delivery procedure, the PCRF gets the congestion levels at the P-GW and RAN user plane from the PCEF and RCAF, respectively. Furthermore, PCRF gets the user location and RAT-Type from the PCEF during the IP-CAN Session Establishment and Modification procedures.

In an SCEF-initiated location context request procedure, the UE's location context requests are executed as a part of another procedure (e.g. group communication to UEs of specific location) and used to determine how the other procedure will be executed.

DETAILED DESCRIPTION OF ILLUSTRATIVE EMBODIMENTS

Figure 1:
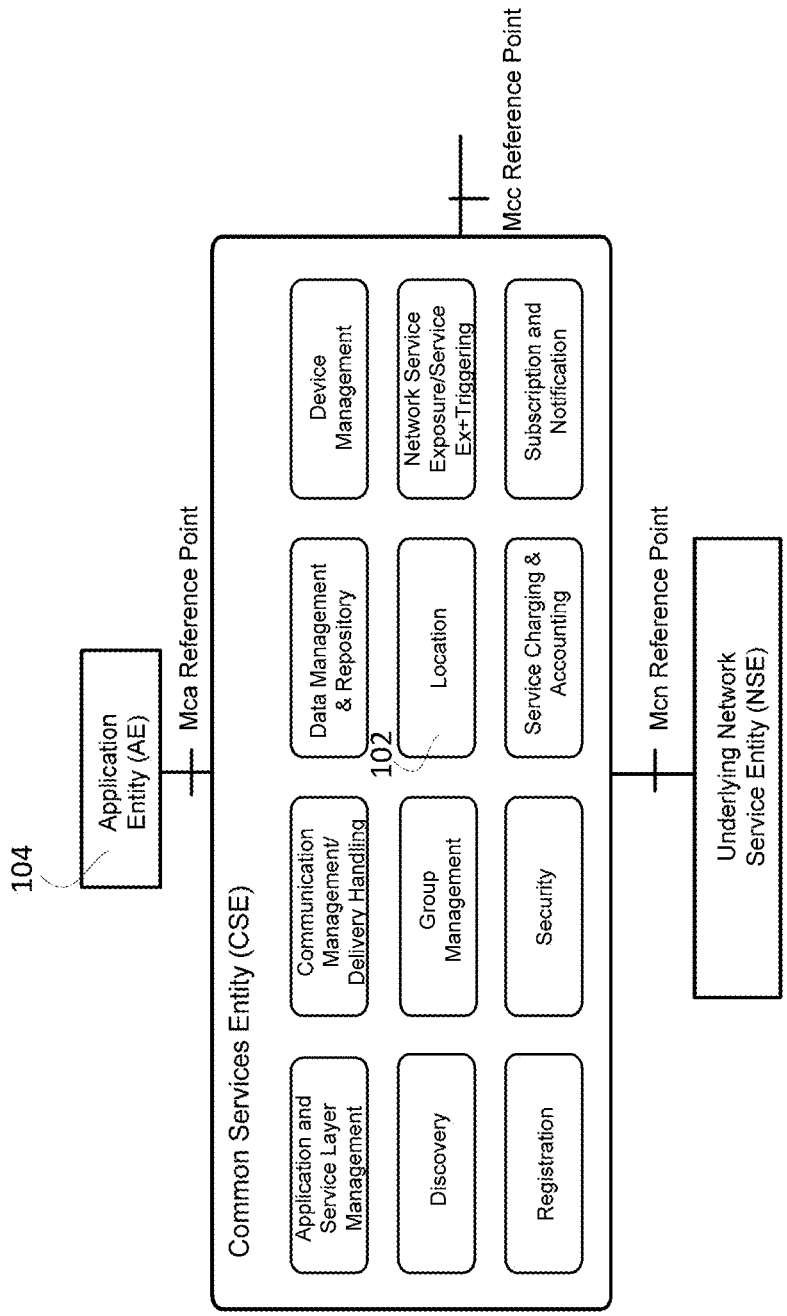
FIG. 1 is a diagram that illustrates oneM2M CSE and CSFs.
Figure 2:
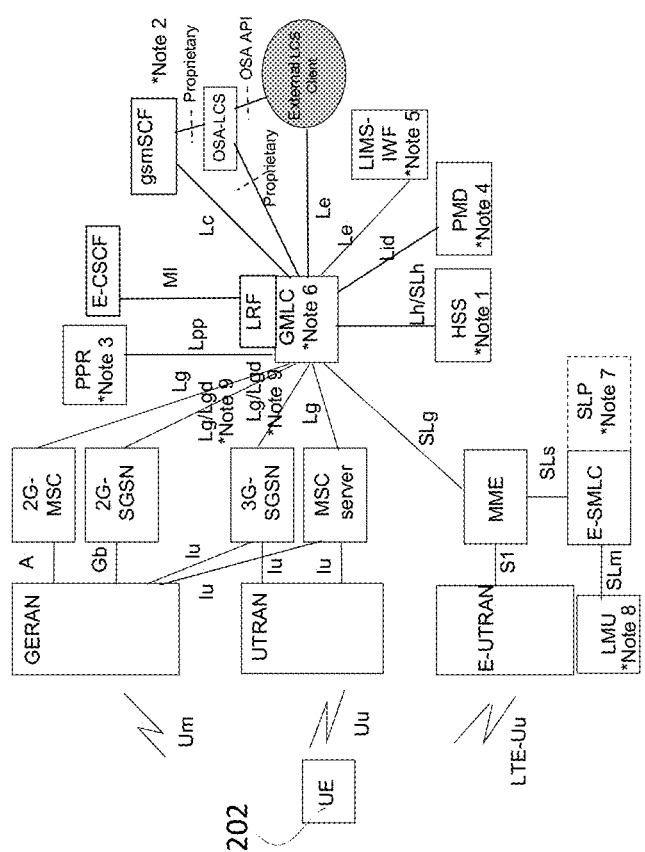
FIG. 2 is a diagram that illustrates a general arrangement of LCS.
Figure 3:
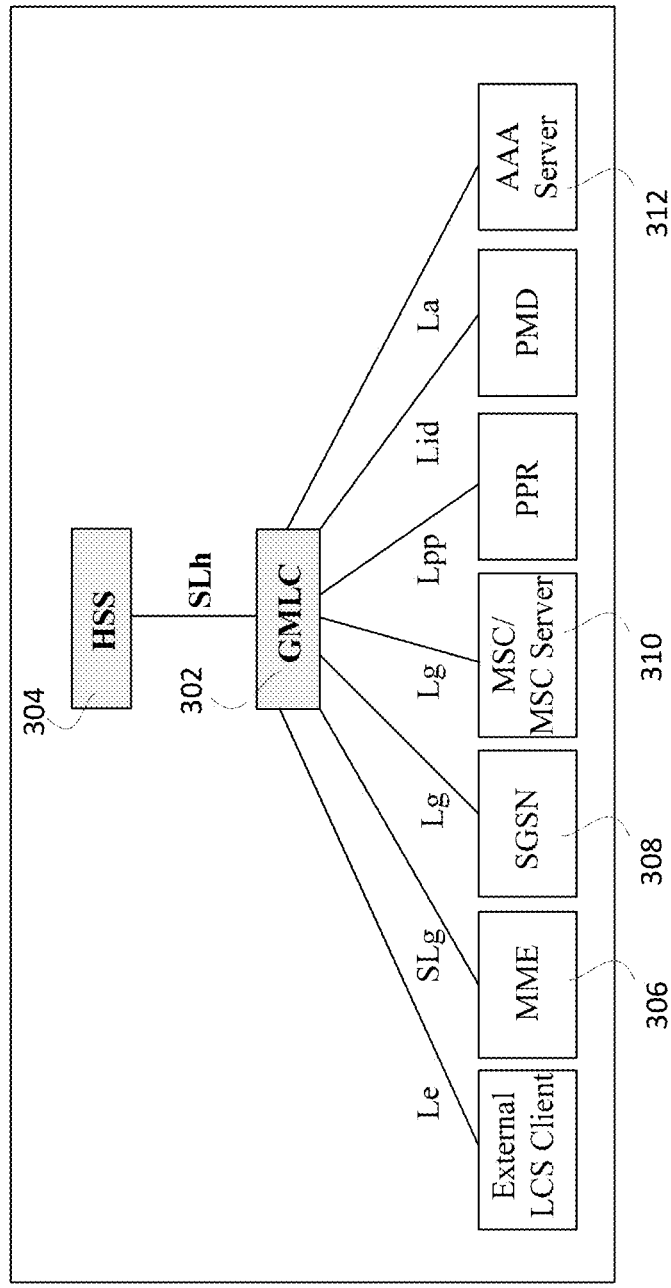
FIG. 3 is a diagram that illustrates an overview of the LCS Functional Architecture.
Figure 4:
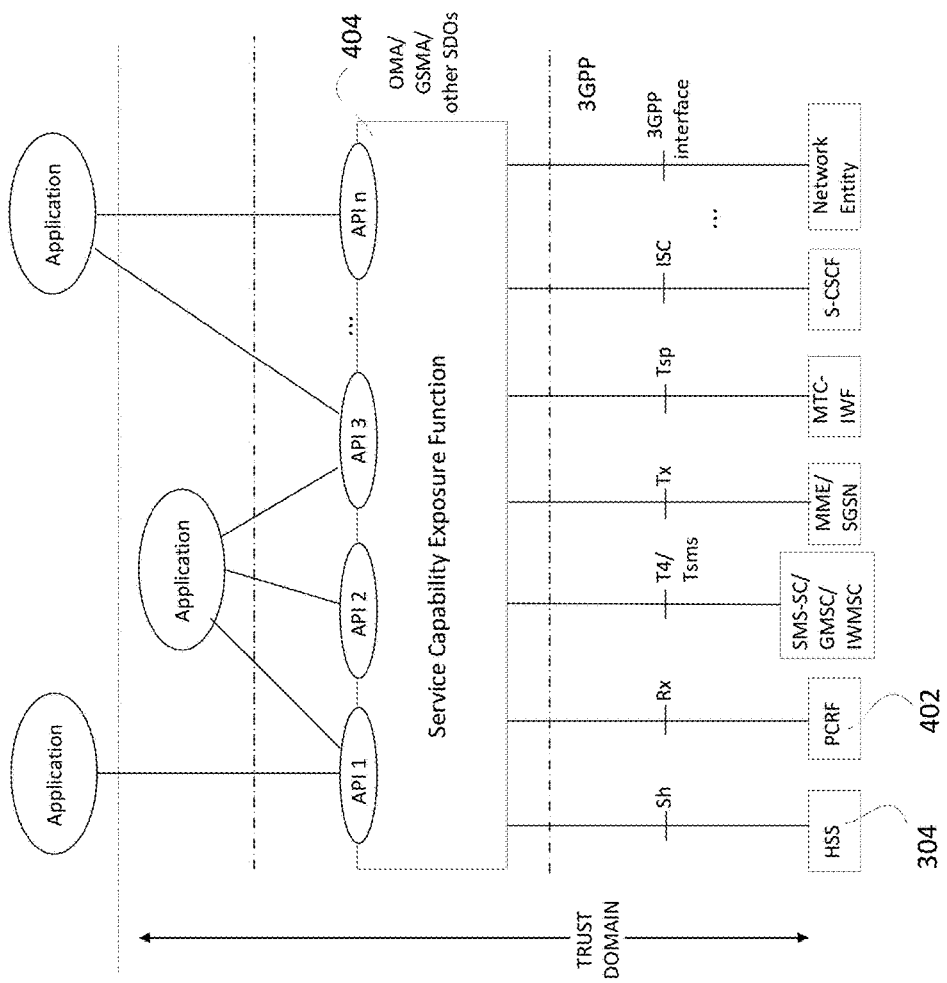
FIG. 4 is a diagram that illustrates a 3GPP SCEF Architecture.
Figure 5:
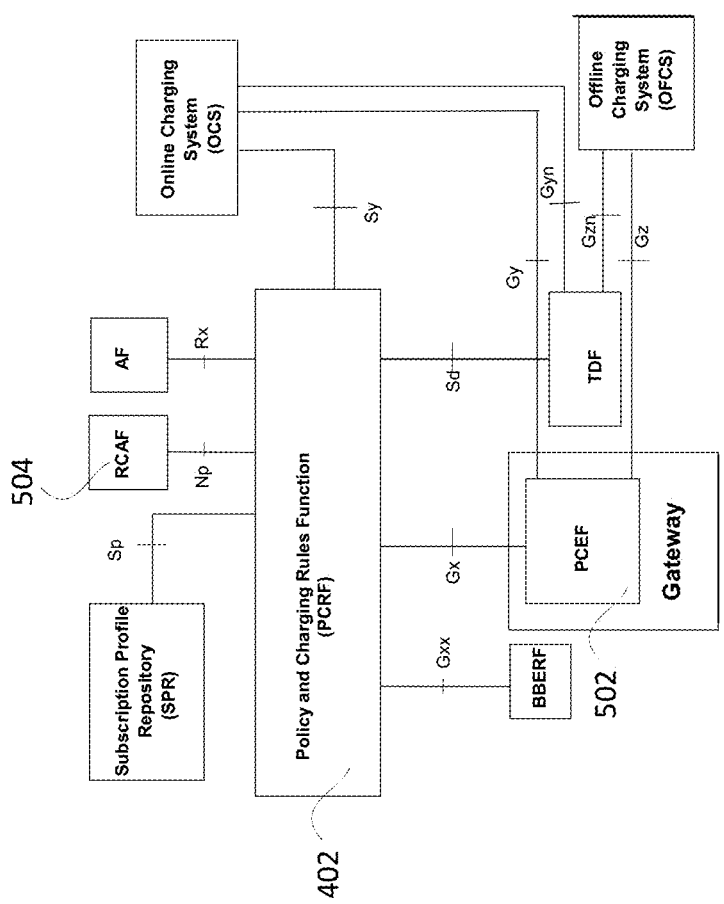
FIG. 5 is a diagram that illustrates an overall PCC logical architecture.

Important terms and acronyms used throughout this disclosure.
AAA Authentication, Authorization, and Accounting
AE Application Entity
AESE Architecture Enhancements for Service Capability Exposure
APN Access Point Name
API Application Program Interface
AS Application Server
AVP Attribute-Value Pairs
BM-SC Broadcast Multicast Service Center
BSC Base Station Controller
CBS Cell Broadcast Service
CCA Credit-Control-Answer
CCR Credit-Control-Request
CSF Common Service Function
DNS Domain Name System
GERAN GSM EDGE Radio Access Network
GMLC Gateway Mobile Location Center
GGSN Gateway GPRS Support Node
GSM Global System for Mobile Communications
GSMA GSM Association
E-SMLC Evolved Serving Mobile Location Center
E-UTRAN Enhanced UTRAN
EDGE Enhanced Data rates for GSM Evolution
ELP EPC LCS Protocol
EPC Evolved Packet Core
EPS Evolved Packet System
HLR Home Location Register
HSS Home Subscriber Server
I-WLAN Interworking WLAN
IW-MT-LR Mobile Terminated Location Request for an I-WLAN
IE Information Element
IMSI International Mobile Subscriber Identity
LBS Location Based Services
LCS Location Services
LOC Location
LTE Long Term Evolution
MBMS Multimedia Broadcast Multicast Service
MCN Mobile Core Network
MLP Mobile Location Protocol
MME Mobility Management Entity
MSC Mobile Switching Center
MT-LR Mobile Terminated Location Request
MTC Machine Type Communication
NAS Non Access Stratum
NRR Non-Aggregated-RUCI-Report-Request
OAM Operations, administration and management
OMA Open Mobile Alliance
OSA-API Open Service Access Application Programming Interface
P-GW Packet Data Network Gateway
PCC Policy and Charging Control
PDN Packet Data Network
PDP Packet Data protocol
PLMN Public Land Mobile Network
PLA Provide-Location-Answer
PLR Provide-Location-Request
PPR Push-Profile-Request
RAN Radio Access Network
RAT Radio Access Technology
RCAF RAN Congestion Awareness Function
RNC Radio Network Controller
RRC Radio Resource Control
RUCI RAN User Plane Congestion Information
SMS Short Message Service
SCS Service Capability Server
SCEF Service Capability Exposure Function
SGSN Serving GPRS Support Node
S-GW Serving Gateway
TGMI Temporary Mobile Group Identity
TWAN Trusted WLAN Access Network
UDP User Datagram Protocol
UE User Equipment
UMTS Universal Mobile Telecommunications System
UTRAN Universal Terrestrial Radio Access Network
WLAN Wireless Local Area Network An M2M Server queries the Mobile Core Network (MCN) to learn the geographical position of a UE 202. The M2M Server would like to know more about the UE's geographical context. For example, what networks are accessible to the UE 202 in its present location (UMTS, LTE, Wi-Fi, etc.)? How useful could the networks be to the UE 202 (i.e. congestion levels)?

Once the M2M Server is aware of the UE's geographical context, it can direct the UE 202 to use the resources that are available to it. For example, it may steer the UE 202 towards certain networks or services. The M2M Server may also know that it is time to activate some service in the UE 202. For example, the availability of new Wi-Fi network may cause the M2M Server to tell the UE 202 to perform service discovery. Finally, the UE's context can be beneficial to other types of Application Servers (AS) as well. For example, the AS can adapt a particular application data rate (e.g. video streaming with adaptive bit rates) to match the data rate of a particular RAT (among the available ones).

Location based context can sometimes be required by the SCEF 404 to more efficiently execute procedures that are not specifically location related. For example, an SCS may wish to distribute a large message to a group of 100 UE's (regardless of the UEs' location). However, the SCEF 404 may wish to learn information about the UEs' location based context so that it can more intelligently select a delivery method for the group message.

As indicated in oneM2M TS 0001, "geographical location information can include more than simply the longitude and the latitude information." However, current location tracking API's do not provide any location-based context. For example, the OMA "Terminal Location" provides only location and distance metrics, with no consideration of any additional context information.

The UE's context may include available RATs in a particular geographical area such as 3GPP (LTE, UMTS) or non-3GPP (Wi-Fi); RAT connectivity attributes (e.g. congestion level, reliability, security, . . . etc.); charging tariffs of each available RAT The following problems are discussed below:
How to expose a location-based context API to the SCS/AS 602 (e.g. M2M Server)?
How to enable the SCEF 404 to interact with different core network entities to inquire about the location-based context?
For congestion reporting, how to enable communication (protocols and needed information elements) between the SCEF 404 and MME 306, SGSN 308, 3GPP AAA Server 312, PCEF 502, and RCAF 504?
For RAT availability reporting, how to enable communication (protocols/IEs) between the SCEF 404 and potential serving nodes (MME 306, SGSN 308, 3GPP AAA Server 312)?
For location reporting, how to enable communication between the SCEF 404 from one side and GMLC, HSS 304, and PCRF 402 from the other side?
How to convey the location-based context, consolidated by the SCEF 404, to the SCS/AS 602?
How can SCEF 404 implicitly initiate location context request to efficiently execute procedures.

The details of location-based context delivery procedures are described. First, the network architecture showing the SCEF 404 and its interactions with HSS 304, GMLC, PCRF 402, MME 306, SGSN 308, and AAA Server 312. A GMLC-based location context delivery procedure is described, in which the GMLC 302 interacts with the serving nodes (MME 306/SGSN 308/AAA Server 312) to inquire about the UE's location related context including the congestion level at the serving nodes. An HSS-based location context delivery procedure is described in which the HSS 304 interacts with the serving nodes. Alternately, the SCEF 404 can directly interact with the serving nodes to inquire about the UE's location and congestion levels. The SCEF 404 can interact with the PCEF 502 and RCAF 504 to inquire about the congestion. The location-based context delivery procedures in other mechanisms such as group communication are also described.

Figure 6:
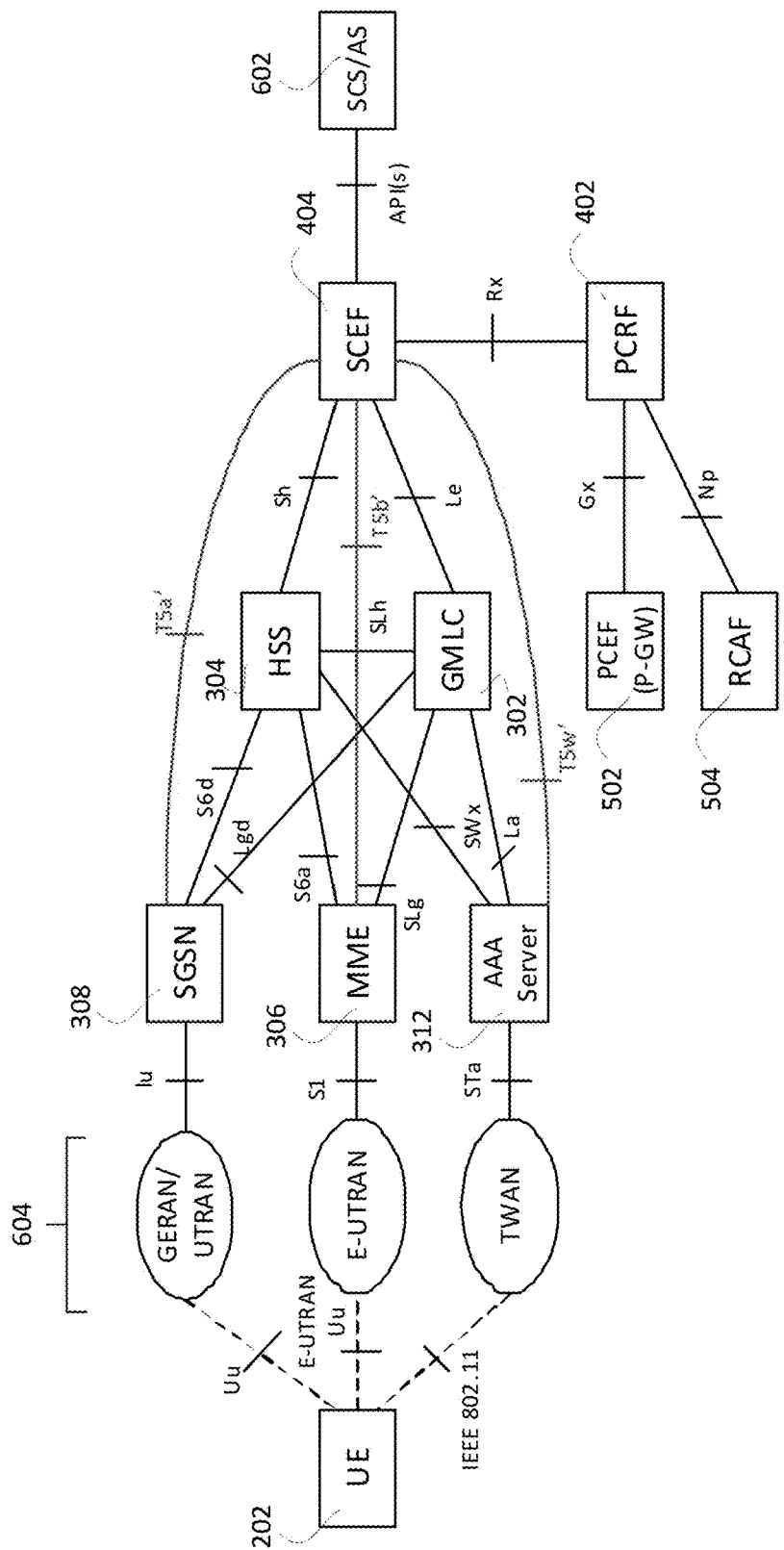
FIG. 6 is a diagram that illustrates a Network Architecture with new reference points.

The network architecture that enables the SCEF 404 and SCS/AS 602 to extract location related context from the EPC is presented. FIG. 6 shows the SCEF as the interface between the SCS/AS and the 3GPP core networks. The SCEF exposes API(s) to the SCS/AS 602. These APIs enable the SCS/AS 602 to access some of the 3GPP network's services. The SCEF 404 interacts with the HSS 304 over the Sh reference point regarding subscriber information. In addition, the SCEF 404 interacts with the GMLC 302 over the Le reference point to inquire about the UE's location. Furthermore, the SCEF 404 communicates with the PCRF 402 over the Rx reference point to be able to get congestion information from the RCAF (over the Np reference point) and P-GW/PCEF 502 (over the Gx reference point).

The SCEF 404 can communicate directly with the serving nodes, namely, MME 306, SGSN 308, and 3GPP AAA Server 312, over the T5a', T5b', and T5w', respectively.

Aside from the SCEF 404, FIG. 6 depicts that the HSS 304 interacts with the serving nodes MME 306, SGSN 308, and 3GPP AAA Server 312 over the S6a, S6d, and Swx, respectively. Similarly, the GMLC 302 interacts with the same serving nodes over SLg, Lgd, and La reference points. Furthermore, each of the serving nodes is connected to its RAN node 604 (EUTRAN/UTRAN/GERAN/WLAN) and communicating over the respective Iu, S1, and STa reference points. Finally, each RAN node 604 is connected wirelessly with the UE 202 via the associated RAT.

It is understood that the functionality illustrated in FIG. 6, may be implemented in the form of software (i.e., computer-executable instructions) stored in a memory of, and executing on a processor of, a wireless device or other apparatus (e.g., a server, gateway, device, or other computer system), such as one of those illustrated in FIG. 14C or 14D described below. It is also understood that the functionality illustrated in FIG. 6 may implemented as a set of virtualized network functions. The network functions may not necessarily communicate directly, rather, they may communicate via forwarding or routing function.

GMLC-Based Location Context Delivery Procedure

This section describes a solution that provides location context of a particular UE 202 to the SCS/AS 602. The solution utilizes the GMLC 302 to report the location of the UE 202, using the RAT that can be accessed by the UE 202. In doing so, the GMLC 302 will be able to tell the SCEF 404 what RATs are available to the UE 202. Furthermore, the congestion level at the serving nodes (e.g. MME 306, SGSN 308, 3GPP AAA Server 312) will be reported to the GMLC. All of this information will be reported to the SCEF 404.

Figure 7:
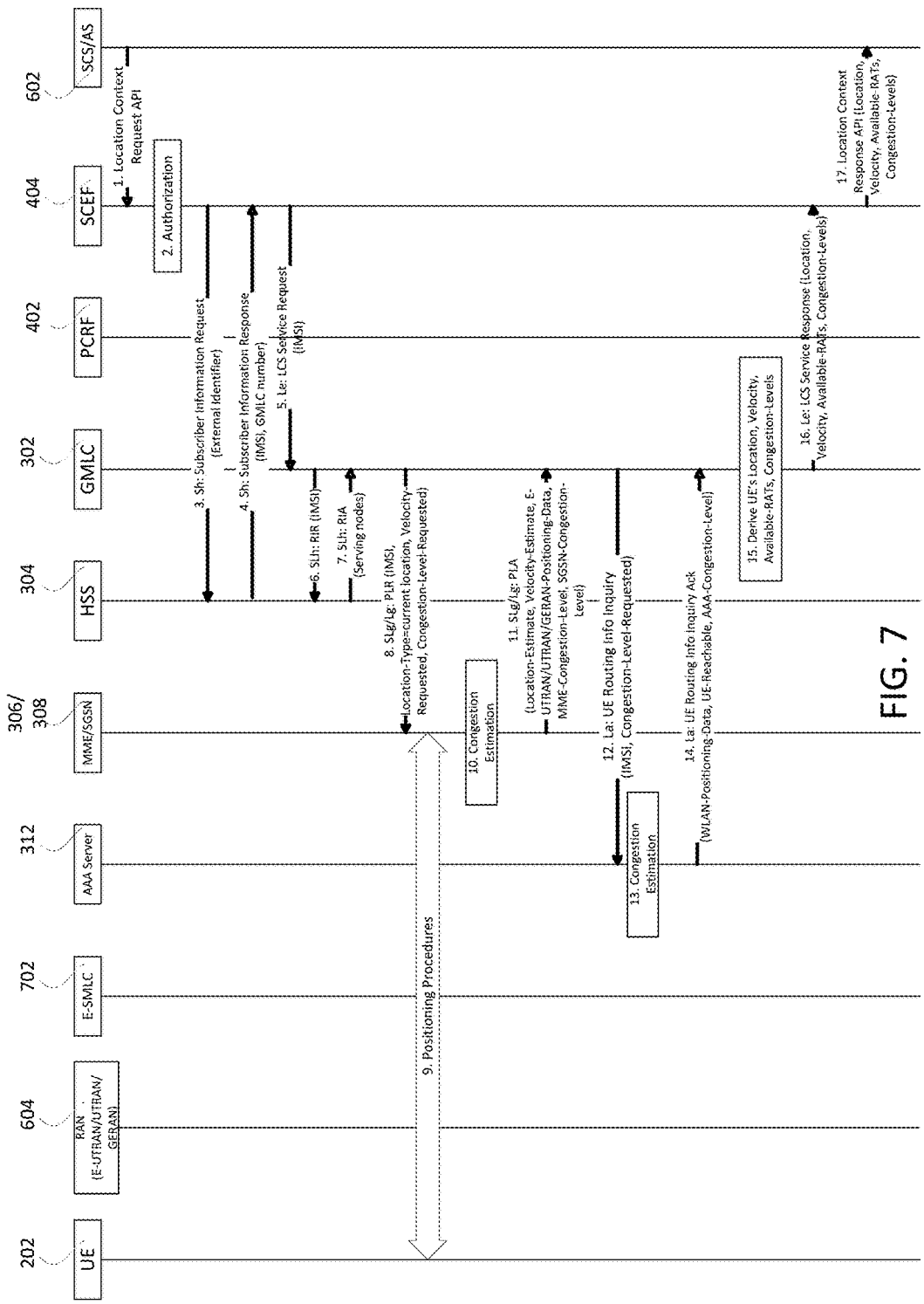
FIG. 7 is a diagram that illustrates a GMLC-based location context delivery procedure.

In step 1 of FIG. 7, the SCS/AS 602 starts inquiring about the location of a given UE 202 by sending a "Location Context Request" (External Identifier, SCS Identifier) API to the SCEF 404. The SCS/AS 602 may determine the IP address(es)/port(s) of the SCEF 404 by performing a DNS query using the External Identifier or using a locally configured SCEF identifier. The 'External Identifier' of a UE 202 is defined according to TS 23.682 "Architecture Enhancements to facilitate communications with Packet Data Networks and Applications". Furthermore, it may be possible to use MSISDN as SCS identifier, as indicated in TS 23.682.

A new API "Location Context Request" can inquire about the context of a particular UE 202, including location, velocity, congestion levels at serving nodes, and available RATs.

In step 2 of FIG. 7, the SCEF 404 checks to see if the SCS/AS 602 is authorized to get the location context of the UE 202 in consideration. If so, the flow moves to step 3. Otherwise, the flow stops and the SCEF 404 reports the rejection and its cause to the SCS/AS 602.

In step 3 of FIG. 7, once the request is authorized, the SCEF 404 sends "Subscriber Information Request" (External Identifier, SCS Identifier) to the HSS 304, over the Sh reference point, to obtain the GMLC number that is associated with the UE 202 and to obtain the identities of the UE's serving nodes.

In step 4 of FIG. 7, the HSS 304 replies by sending "Subscriber Information Response" (IMSI or External Identifier, GMLC number, Serving nodes) message to the SCEF 404. The HSS 304 resolves the External Identifier to IMSI and retrieves the related HSS 304 stored routing information including the identities of the UE's serving CN node(s) (MME 306, SGSN 308, 3GPP AAA Server 312 or MSC 310). The GMLC number is the E.164 address of the GMLC 302, identified in TS 23.008 "Organization of subscriber data" (clause 2.4.9.2). The GMLC number(s) identify the GMLC(s) for the particular UE 202 from which a location request for this UE 202 may be done. The HSS 304 may send the IMSI to the SCEF 404 or not.

In step 5 of FIG. 7, once the SCEF 404 receives the GMLC number, it identifies a particular GMLC that is specified by the GMLC number. Then, it sends "LCS Service Request" (IMSI or External Identifier) message to the GMLC 302 over the Le reference point. This message will be extended version of the existing one, which is defined in the OMA Mobile Location Protocol (MLP) and Open Service Access Application Programming Interface (OSA-API), TS 29.198. The extended message will include additional information elements (e.g. RAT-Requested, Congestion-Requested) to indicate the need for the location context of that UE 202, including available RATs and congestion levels. The target UE 202 will be identified via IMSI, External ID, or MSISDN.

Optionally, the SCEF 404 may provide the serving node addresses, which were obtained in step 4, to the GMLC 302 in the "LCS Service Request."

In step 6 of FIG. 7, consequently, the GMLC 302 contacts the HSS 304 to retrieve the serving nodes for the UE 202 specified by its IMSI. In particular, the GMLC 302 sends "LCS-Routing-Info-Request (RIR)" (IMSI) message to the HSS 304, over the SLh reference point, indicating the UE's IMSI. Table 5.2.1.1/1 of TS 29.173 presents the IEs of the RIR message.

Step 6 and step 7 of FIG. 7 may be skipped if the SCEF 404 provided the serving node addresses to the GMLC 302 in the "LCS Service Request."

In step 7 of FIG. 7, in response, the HSS 304 sends the "LCS-Routing-Info-Answer (RIA)" message (Serving nodes) to the GMLC 302 over the SLh reference point. As described in Table 5.2.1.1/2 of TS 29.173 "Diameter-based SLh interface for Control Plane LCS.", the HSS 304 will convey the 'Serving Node' and 'Additional Serving Node(s)' IEs to the GMLC 302 informing it about all serving nodes (MME 306, SGSN 308, 3GPP AAA Server 312 or MSC 310).

In step 8 of FIG. 7, as the GMLC 302 acquires the addresses of the serving nodes (MME 306/SGSN 308/3GPP AAA Server), it starts contacting them to check if the UE 202 can be accessed via that serving node. First and for the 3GPP access, the GMLC 302 contacts the MME 306/SGSN 308 serving node. More precisely, it sends "Provide-Location-Request (PLR)" (External ID or IMSI, Type=current location, Velocity-Requested, Congestion-Level-Requested) message to the MME 306/SGSN 308, over the SLg/Lg reference point. In its request, it indicates its desire to obtain the current location and velocity of the particular UE 202 (identified by its External ID or IMSI). The complete IEs of the standard PLR message are shown in Table 6.2.2-1 of TS 29.172 "Location Services (LCS); Evolved Packet Core (EPC) LCS Protocol (ELP) between the Gateway Mobile Location Centre (GMLC) and the Mobile Management Entity (MME); SLg interface".

A 'Congestion-Level-Requested' IE can be included in the PLR message to indicate the GMLC 302's desire to know the congestion levels at the MME 306/SGSN 308.

In step 9 of FIG. 7, in response, the MME 306/SGSN 308 communicates with the UE 202 to check if it is still attached and to get its current location. The specific behaviors of MME 306 and SGSN 308 were explained above.

In step 10 of FIG. 7, the MME 306 and SGSN 308 can include an indication of their congestion level in their response to the GMLC 302.

In step 11 of FIG. 7, once the MME 306/SGSN 308 has an estimate of the UE's location information along with its congestion levels, it sends "Provide-Location-Answer (PLA)" (Location-Estimate, Velocity-Estimate, E-UTRAN-Positioning-Data, UTRAN-Positioning-Data, GERAN-Positioning-Data, MME 306-Congestion-Level, SGSN-Congestion-Level) message to the GMLC 302. The 'Location-Estimate' and 'Velocity-Estimate' IEs provide the calculated estimates of the UE's location and velocity. Furthermore, the 'E-UTRAN-Positioning-Data' IE provides the obtained location estimate of the UE 202, which is attached to the E-UTRAN access and is sent by the MME 306 or the combined MME 306/SGSN 308. This IE will not contain valid location information, when the UE 202 is not attached to MME 306. Therefore, the 'E-UTRAN-Positioning-Data' IE can be used to know if E-UTRAN RAT is available to the UE 202 or not. Similarly, the 'UTRAN-Positioning-Data' and 'GERAN-Positioning-Data' IEs represent the individual location estimates, received over the UTRAN and GERAN RATs, respectively. The complete IEs of the PLA message are indicated in Table 6.2.2-2 of TS 29.172.

The 'E-UTRAN-Positioning-Data', 'UTRAN-Positioning-Data', and 'GERAN-Positioning-Data' IEs can be used to know if the UE 202 has access to E-UTRAN, UTRAN, and/or GERAN RATs, respectively. Furthermore, new 'MME-Congestion-Level' and 'SGSN-Congestion-Level' IEs can be included in the "PLA" message, which will include the congestion levels at the MME 306 and SGSN 308, as calculated in step 10. The 'MME-Congestion-Level' and 'SGSN-Congestion-Level' IEs may be a numeric (i.e. integer) value that is used to indicate a relative congestion level or they may be an alpha-numeric text string that indicates the relative congestion level (i.e. low, medium, high).

In step 12 of FIG. 7, the GMLC 302 queries the 3GPP AAA Server 312 to obtain the address of WLAN UE 202 by sending the "UE Routing Info Inquiry" (IMSI or External Identifier, Congestion-Level-Requested) message over the La reference point. The GMLC 302 knows the address of the 3GPP AAA Server 312 from step 7.

The 'Congestion-Level-Requested' IE can be included in the "UE Routing Info Inquiry" message to inquire about the congestion level at the 3GPP AAA Server 312.

In step 13 of FIG. 7, the 3GPP AAA Server 312 estimates its congestion level by considering the number of UEs, which are connected through it to the core network.

In step 14 of FIG. 7, the 3GPP AAA Server 312 sends the "UE Routing Info Inquiry Ack" (WLAN-Positioning-Data, UE-Reachable, AAA-Congestion-Level) message to the GMLC 302 over the La reference point. The 'WLAN-Positioning-Data' IE includes the available location information of the UE 202. If there is no tunnel available between the P-GW and the UE 202, the AAA will return an indication that UE 202 is not reachable, i.e., 'UE-Reachable=false'.

The 'AAA-Congestion-Level' IE can be included in the "UE Routing Info Inquiry Ack" message to include the congestion level at the 3GPP AAA Server 312. The 'AAA-Congestion-Level' IE may be a numeric (i.e. integer) value that is used to indicate a relative congestion level or they may be an alpha-numeric text string that indicates the relative congestion level (i.e. low, medium, high).

In step 15 of FIG. 7, based on all the received location estimates from the MME 306, SGSN 308, and 3GPP AAA Server 312, the GMLC 302 will derive the best estimate of the UE's location and velocity. Furthermore, it will be able to identify the available RATs to the UE 202. For example, if the 'E-UTRAN-Positioning-Data' was received from the MME 306, this means that the UE 202 can access the E-UTRAN RAT. Similarly, the GMLC 302 will be able to decide the availability of the UTRAN/GERAN and WLAN RATs depending on the corresponding received information from the SGSN 308 and 3GPP AAA Server 312, respectively. Finally, the GMLC 302 will concatenate all the received congestion levels from the MME 306, SGSN 308, and 3GPP AAA Server 312.

In step 16 of FIG. 7, the GMLC 302 sends the "LCS Service Response" (Location, Velocity, Available-RATs, Congestion-Levels) message to the SCEF 404 over the Le reference point.

New IEs 'Available-RATs' and 'Congestion-Levels' are added to the "LCS Service Response" to convey the UE's complete location context.

In step 17 of FIG. 7, the SCEF 404 sends a "Location Context Response" (Location, Velocity, Available-RATs, Congestion-Levels) API carrying the UE's context information, received from the GMLC 302 in step 16.

Figure 14A:
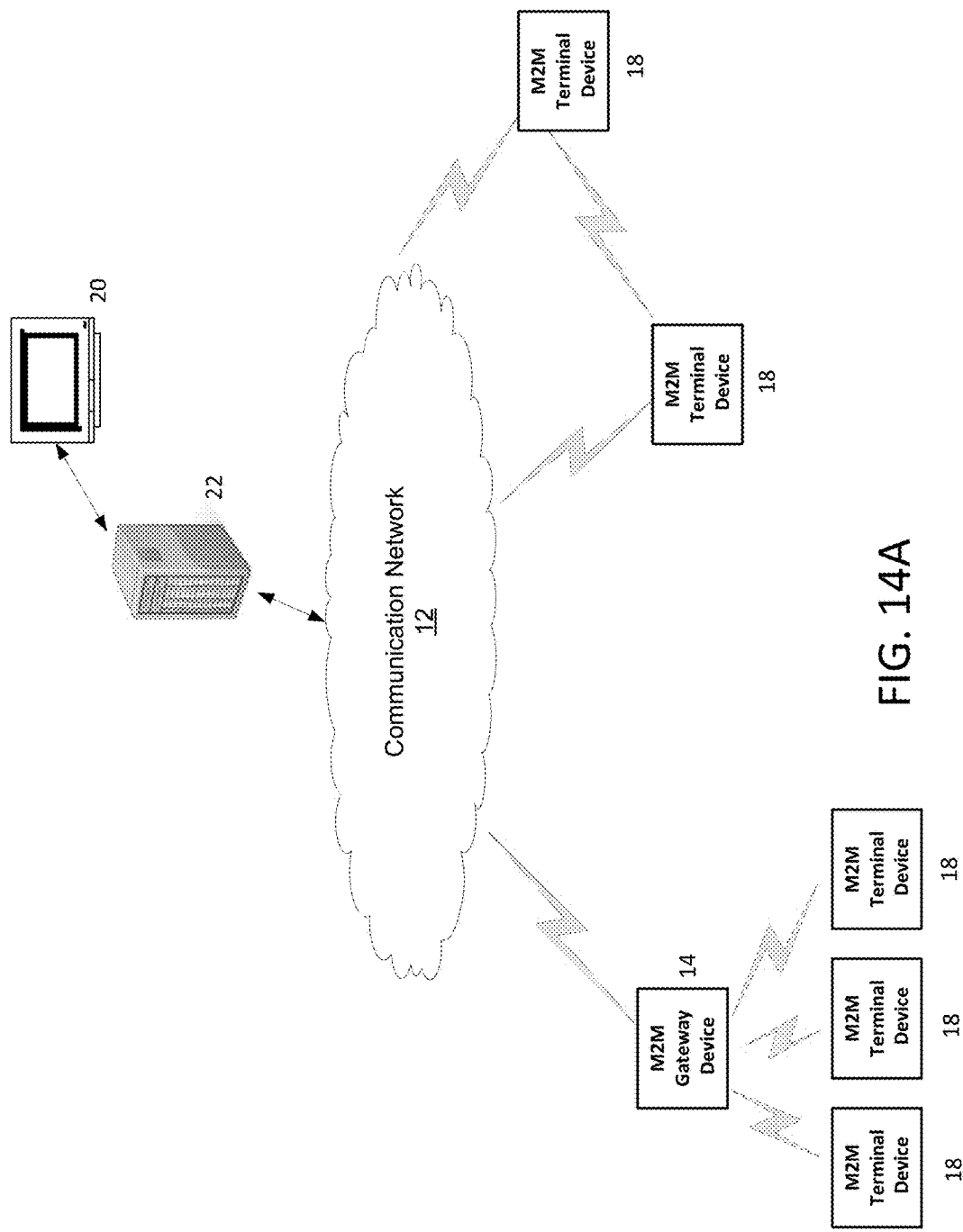
FIG. 14A is a diagram of a M2M/IoT/WoT communication system that includes a communication network.
Figure 14B:
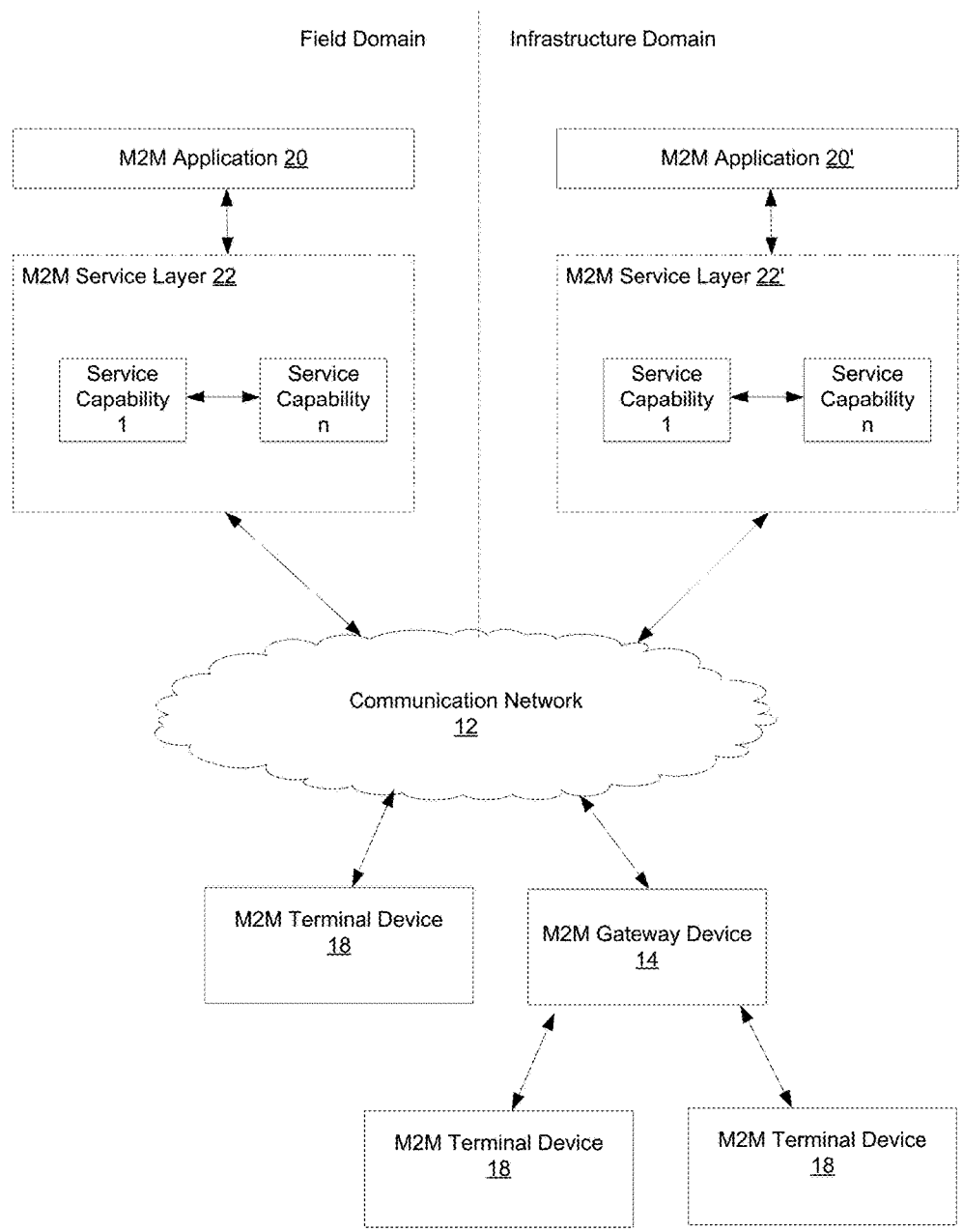
FIG. 14B is a diagram of an illustrated M2M service layer in the field domain that provides services for the M2M application, M2M gateway devices, and M2M terminal devices and the communication network.
Figure 14C:
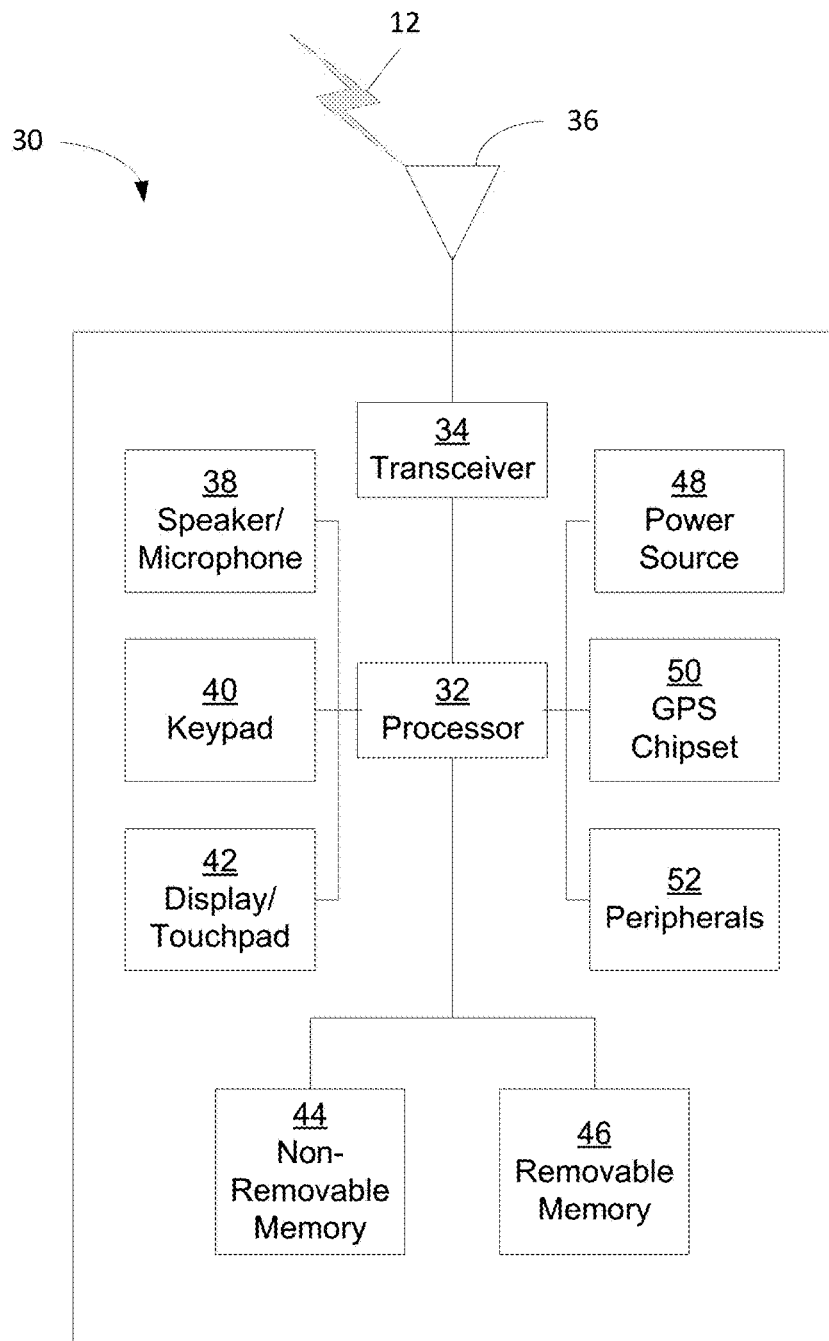
FIG. 14C is a diagram of an example end node such as an UE or other end node device.
Figure 14D:
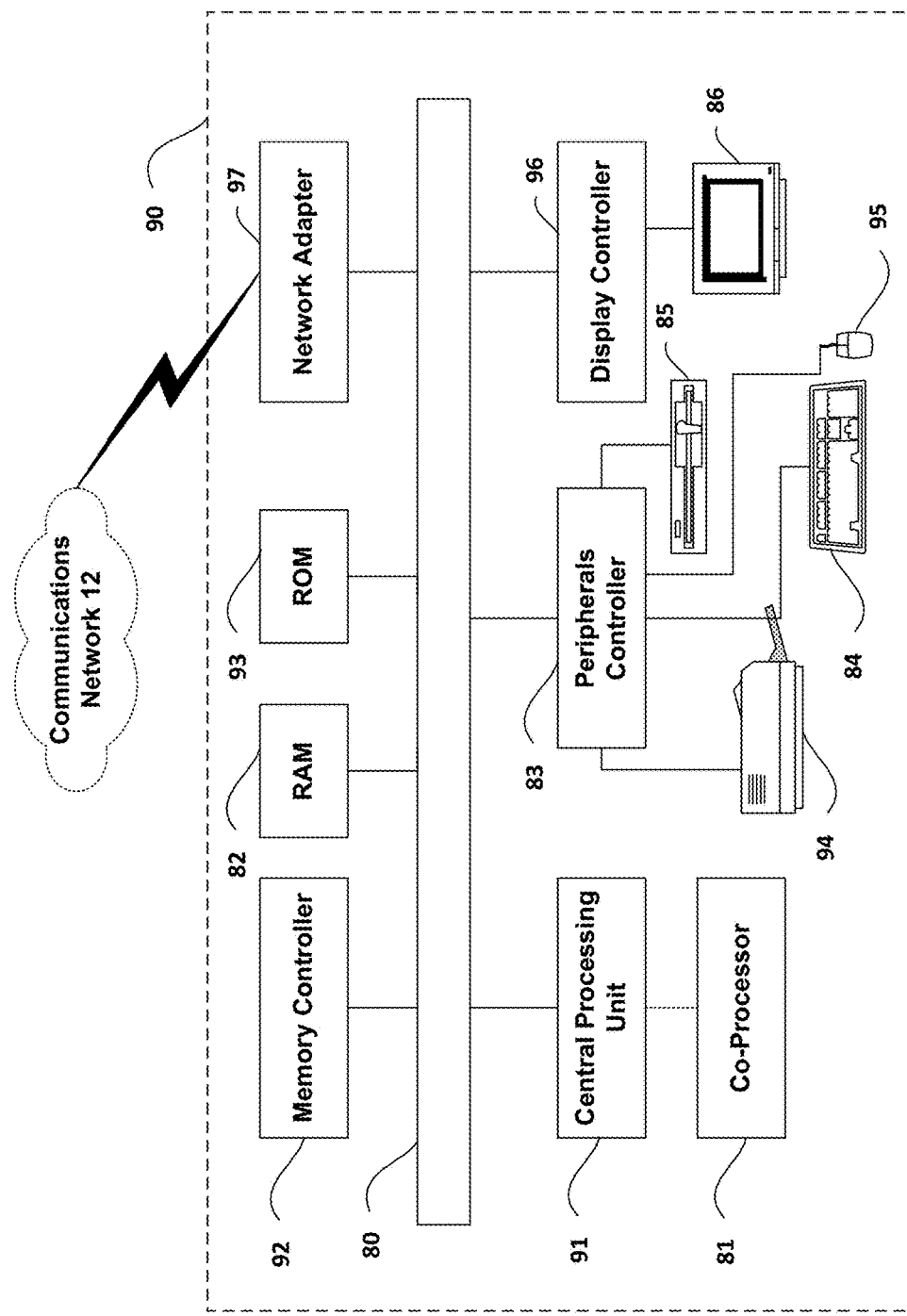
FIG. 14D is a block diagram of a computer system or server that may be used to implement any of the network nodes described herein.

It is understood that the entities performing the steps illustrated in FIG. 7 may be logical entities that may be implemented in the form of software (i.e., computer-executable instructions) stored in a memory of, and executing on a processor of, an apparatus configured for wireless and/or network communications or a computer system such as those illustrated in FIG. 14C or FIG. 14D. That is, the method(s) illustrated in FIG. 7 may be implemented in the form of software (i.e., computer-executable instructions) stored in a memory of an apparatus, such as the apparatus or computer system illustrated in FIG. 14C or FIG. 14D, which computer executable instructions, when executed by a processor of the apparatus, perform the steps illustrated in FIG. 7. It is also understood that the functionality illustrated in FIG. 7 may implemented as a set of virtualized network functions. The network functions may not necessarily communicate directly, rather, they may communicate via forwarding or routing function. It is also understood that any transmitting and receiving steps illustrated in FIG. 7 may be performed by communication circuitry of the apparatus under control of the processor of the apparatus and the computer-executable instructions (e.g., software) that it executes.

In this section, a location context delivery procedure uses the HSS 304 to interrogates the serving nodes. Unlike the solution above, this solution does not utilize the GMLC 302.

The call flow in FIG. 8 can be described as follows.

Figure 8:
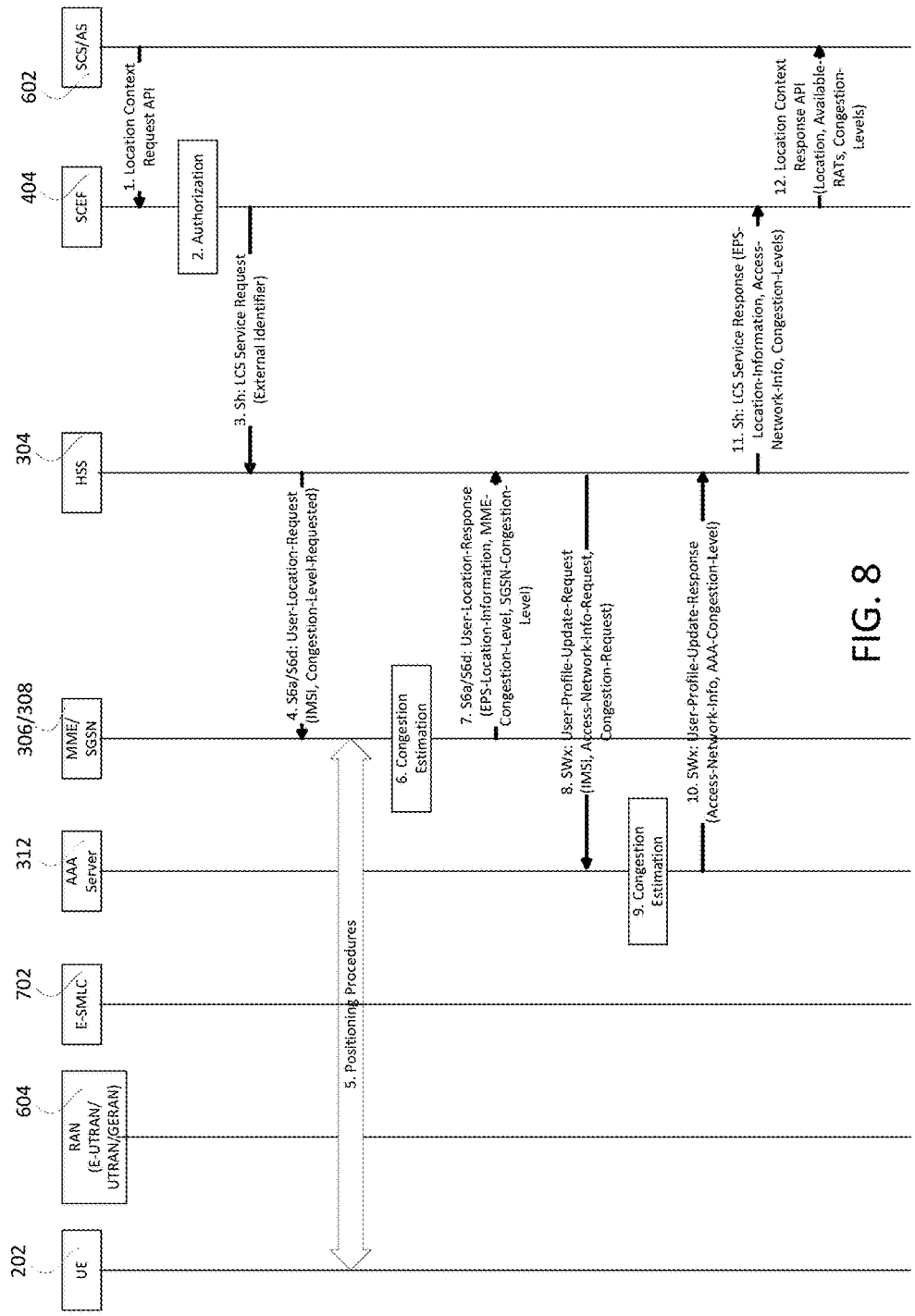
FIG. 8 is a diagram that illustrates an HSS-based location context delivery procedure.

Steps 1-2 of FIG. 8 are similar to steps 1-2 in FIG. 7.

In step 3 of FIG. 8, once the SCEF 404 authorizes the SCS's context request, it interrogates the HSS 304 about the UE's context via a "LCS Service Request" (External Identifier) message.

The SCEF 404 can send a new "LCS Service Request" (External Identifier) message to the HSS 304 over the Sh reference point.

In step 4 of FIG. 8, the HSS 304 maps the UE's 'External Identifier' to its IMSI. Furthermore, it retrieves the addresses of all the serving nodes (e.g. MME 306, SGSN 308, 3GPP AAA Server 312) that have been recorded in the user's profile. If an address of the MME 306/SGSN 308 is recorded, it communicates with the MME 306/SGSN 308 to inquire about the UE's location.

The HSS 304 can send a new "User Location Request" (IMSI, Congestion-Level-Requested) message to the MME 306/SGSN 308 over the S6a/S6d reference point. The 'Congestion-Level-Requested' AVP indicate the HSS 304's desire to know the congestion level at the MME 306/SGSN 308 serving nodes.

In steps 5-6 of FIG. 8, the MME 306/SGSN 308 performs standard positioning procedures and estimates the congestion level at the MME 306/SGSN 308, similar to steps 9 and 10 of FIG. 7.

In step 7 of FIG. 8, the MME 306/SGSN 308 stores the user location information in the 'EPS-Location-Information' AVP, which includes the 'MME 306-Location-Information' and 'SGSN-Location-Information', as indicated in TS 29. 272 "Mobility Management Entity (MME) and Serving GPRS Support Node (SGSN) related interfaces based on Diameter protocol, (Release 12), V12.6.0 September 2014." Each of these AVPs will include 'Geographical-Information' AVP (clause 7.3.123 of TS 29. 272), which contains the geographical Information of the user.

The MME 306/SGSN 308 can send a new "User Location Response" (EPS-Location-Information, MME-Congestion-Level, SGSN-Congestion-Level) message to the HSS 304 over the S6a/S6d reference point. Via receiving one of more 'Geographical-Information' from the MME 306, the HSS 304 will be able to know the currently available RAT(s) (E-UTRAN, UTRAN). Furthermore, the new 'MME-Congestion-Level' and 'SGSN-Congestion-Level' AVPs can be used, which will include the congestion levels at the MME 306 and SGSN 308, as calculated in step 6 above.

In step 8 of FIG. 8, If the HSS 304 has an address for the 3GPP AAA Server 312, it means that the UE 202 has an ongoing WLAN connection.

In order for the HSS 304 to inquire about the UE's location, the HSS 304 can send a modified "User-Profile-Update-Request" (IMSI, Access-Network-Info-Request, Congestion-Request) message to the 3GPP AAA Server 312 over the SWx reference point. The 'Congestion-Request' indicates the HSS's desire to be informed about the congestion level at the 3GPP AAA Server 312. The 'Access-Network-Info-Request' AVP indicates that the HSS 304 requests the 3GPP AAA Server 312 the identity and location information of the access network where the UE 202 is currently attached (clause 8.2.3.17 of TS 29.273).

In step 9 of FIG. 8, in response, the 3GPP AAA Server 312 estimates its congestion level, similar to step 13 of FIG. 7.

In step 10 of FIG. 8, the 3GPP Server reports its congestion level along with the UE's location to the HSS 304.

The 3GPP AAA Server 312 sends a modified "User-Profile-Update-Response" (Access-Network-Info, AAA-Congestion-Level) message to the HSS 304 over the SWx reference point. The 'Access-Network-Info' AVP contains the identity and location information of the access network where the UE 202 is attached (clause 5.2.3.24 TS 29.273). The new 'AAA-Congestion-Level' AVP provides the congestion level at the access network, where the UE 202 is attached.

In step 11 of FIG. 8, the HSS 304 can send a new LCS Service Response (EPS-Location-Information, Access-Network-Info, Congestion-Levels) message to the SCEF 404 over the Sh reference point. This message carries all the location and congestion AVPs received previously from the MME 306/SGSN 308 and 3GPP AAA Server 312 in steps 7 and 10, respectively.

In step 12 of FIG. 8, the SCEF 404 can derive the 'Available RATs' AVP based on the location information received from the HSS 304. An E-UTRAN, UTRAN, or WLAN is available if 'MME-Location-Information', 'SGSN-Location-Information', or 'Access-Network-Info' contain valid location information. Finally, the SCEF 404 sends "Location Context Response API (Location, Available-RATs, Congestion-Levels)" message to the SCS/AS 602 carrying the required location context.

It is understood that the entities performing the steps illustrated in FIG. 8 may be logical entities that may be implemented in the form of software (i.e., computer-executable instructions) stored in a memory of, and executing on a processor of, an apparatus configured for wireless and/or network communications or a computer system such as those illustrated in FIG. 14C or FIG. 14D. That is, the method(s) illustrated in FIG. 14C or FIG. 8 may be implemented in the form of software (i.e., computer-executable instructions) stored in a memory of an apparatus, such as the apparatus or computer system illustrated in FIG. 14C or FIG. 14D, which computer executable instructions, when executed by a processor of the apparatus, perform the steps illustrated in FIG. 8. It is also understood that the functionality illustrated in FIG. 8 may implemented as a set of virtualized network functions. The network functions may not necessarily communicate directly, rather, they may communicate via forwarding or routing function. It is also understood that any transmitting and receiving steps illustrated in FIG. 8 may be performed by communication circuitry of the apparatus under control of the processor of the apparatus and the computer-executable instructions (e.g., software) that it executes.

SCEF-Anchored Location Context Delivery Procedure

An alternative approach to the location procedure can be anchored at the SCEF 404 instead of the HSS 304. More precisely, the SCEF 404 can interrogate the HSS 304 to obtain the addresses of the serving nodes. Then, it can contact the serving nodes (MME 306/SGSN 308/AAA Server 312), similar to what the HSS 304 has done above. The call flow in FIG. 9 can be explained as flows.

Figure 9:
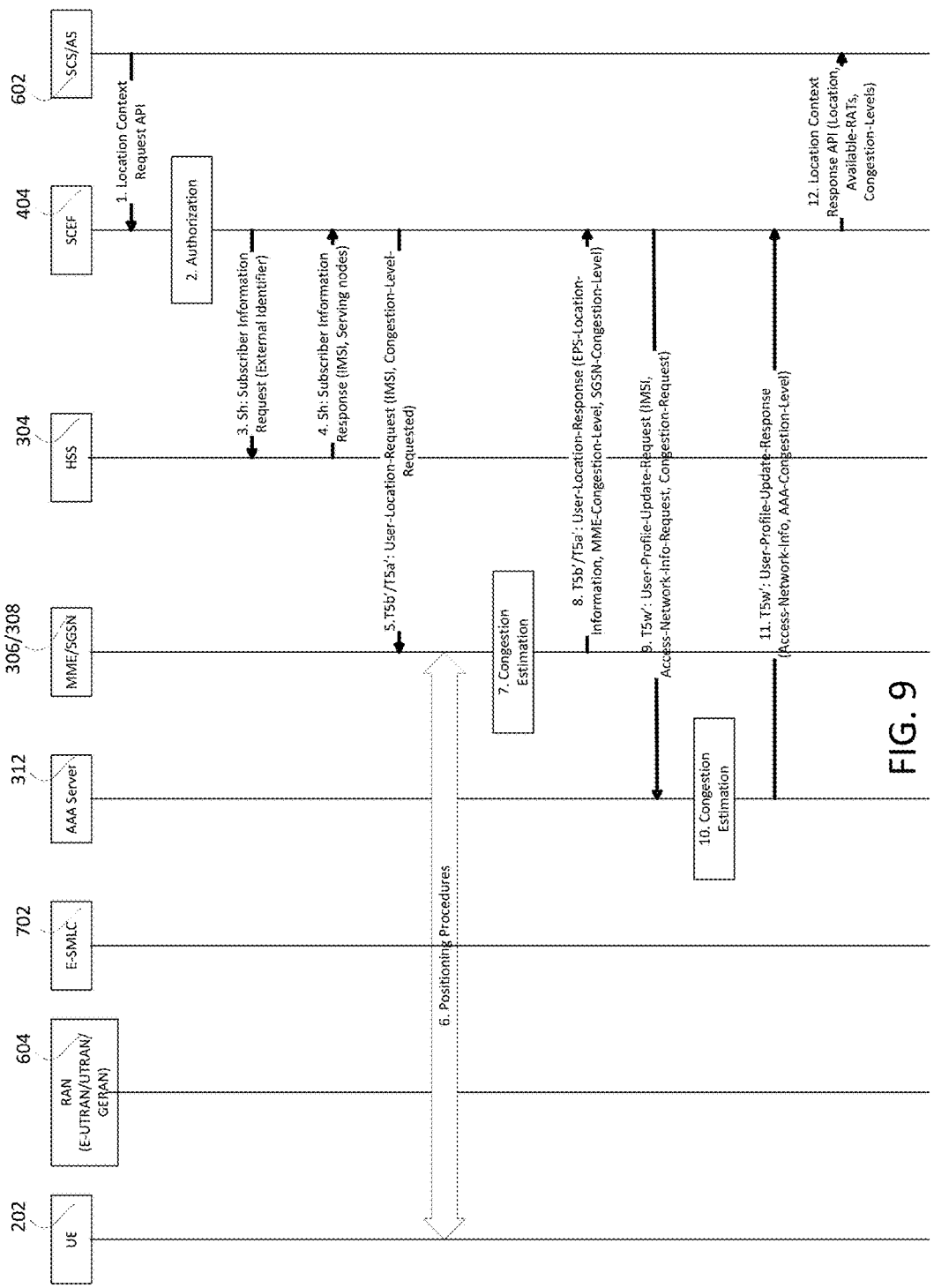
FIG. 9 is a diagram that illustrates an SCEF-anchored Location Context Delivery Procedure.

Steps 1-2 of FIG. 9 are similar to steps 1-2 of FIG. 8.

Steps 3-4 of FIG. 9 are similar to steps 3-4 of FIG. 7. In step 4, the SCEF 404 gets the addresses of the UE's serving nodes (MME 306, SGSN 308, 3GPP AAA Server 312) from the HSS 304.

In step 4 of FIG. 9, the SCEF 404 inquires about the UE's context from the MME 306/SGSN 308 directly. More precisely, the SCEF 404 can send a new "User Location Request" (IMSI or External Identifier, Congestion-Level-Requested) message to the MME 306/SGSN 308 over the T5b'/T5a' reference points.

In steps 6-7 of FIG. 9 are similar to step 11 of FIG. 8.

In step 8 of FIG. 9, and in analogy with step 7 of FIG. 8, MME 306/SGSN 308 sends a new "User Location Response" (EPS-Location-Information, MME-Congestion-Level, SGSN-Congestion-Level) message to the SECF over the new T5b'/T5a' reference point. Via receiving one of more 'Geographical-Information' from the MME 306, the SCEF 404 will be able to know the currently available RAT(s) (E-UTRAN, UTRAN). Furthermore, the new 'MME-Congestion-Level' and 'SGSN-Congestion-Level' AVPs can be used, which will include the congestion levels at the MME 306 and SGSN 308, as calculated in step 7 above.

Steps 9-11 of FIG. 9 are similar to steps 8-10 of FIG. 8, except that the messages (User-Profile-Update-Request/User-Profile-Update-Response) are exchanged over a new T5w reference point between the SCEF 404 and 3GPP AAA Server 312. The AVPs of these messages are similar to the corresponding ones discussed in steps 8-10 of FIG. 8.

Step 12 of FIG. 9 is similar to step 12 of FIG. 8.

It is understood that the entities performing the steps illustrated in FIG. 9 may be logical entities that may be implemented in the form of software (i.e., computer-executable instructions) stored in a memory of, and executing on a processor of, an apparatus configured for wireless and/or network communications or a computer system such as those illustrated in FIG. 14C or FIG. 14D. That is, the method(s) illustrated in FIG. 9 may be implemented in the form of software (i.e., computer-executable instructions) stored in a memory of an apparatus, such as the apparatus or computer system illustrated in FIG. 14C or FIG. 14D, which computer executable instructions, when executed by a processor of the apparatus, perform the steps illustrated in FIG. 9. It is also understood that the functionality illustrated in FIG. 9 may implemented as a set of virtualized network functions. The network functions may not necessarily communicate directly, rather, they may communicate via forwarding or routing function. It is also understood that any transmitting and receiving steps illustrated in FIG. 9 may be performed by communication circuitry of the apparatus under control of the processor of the apparatus and the computer-executable instructions (e.g., software) that it executes.

PCRF-Based Location Context Delivery Procedure

In this section, the SCEF 404 utilizes the PCRF 402 to get the location context of a particular UE 202. The PCRF 402 gets the congestion levels at the P-GW and RAN user plane from the PCEF 502 and RCAF 504, respectively. Furthermore, PCRF 402 gets the user location and RAT-Type from the PCEF 502 during the IP-CAN procedure.

The call flow in FIG. 10 can be described as follows.

Figure 10:
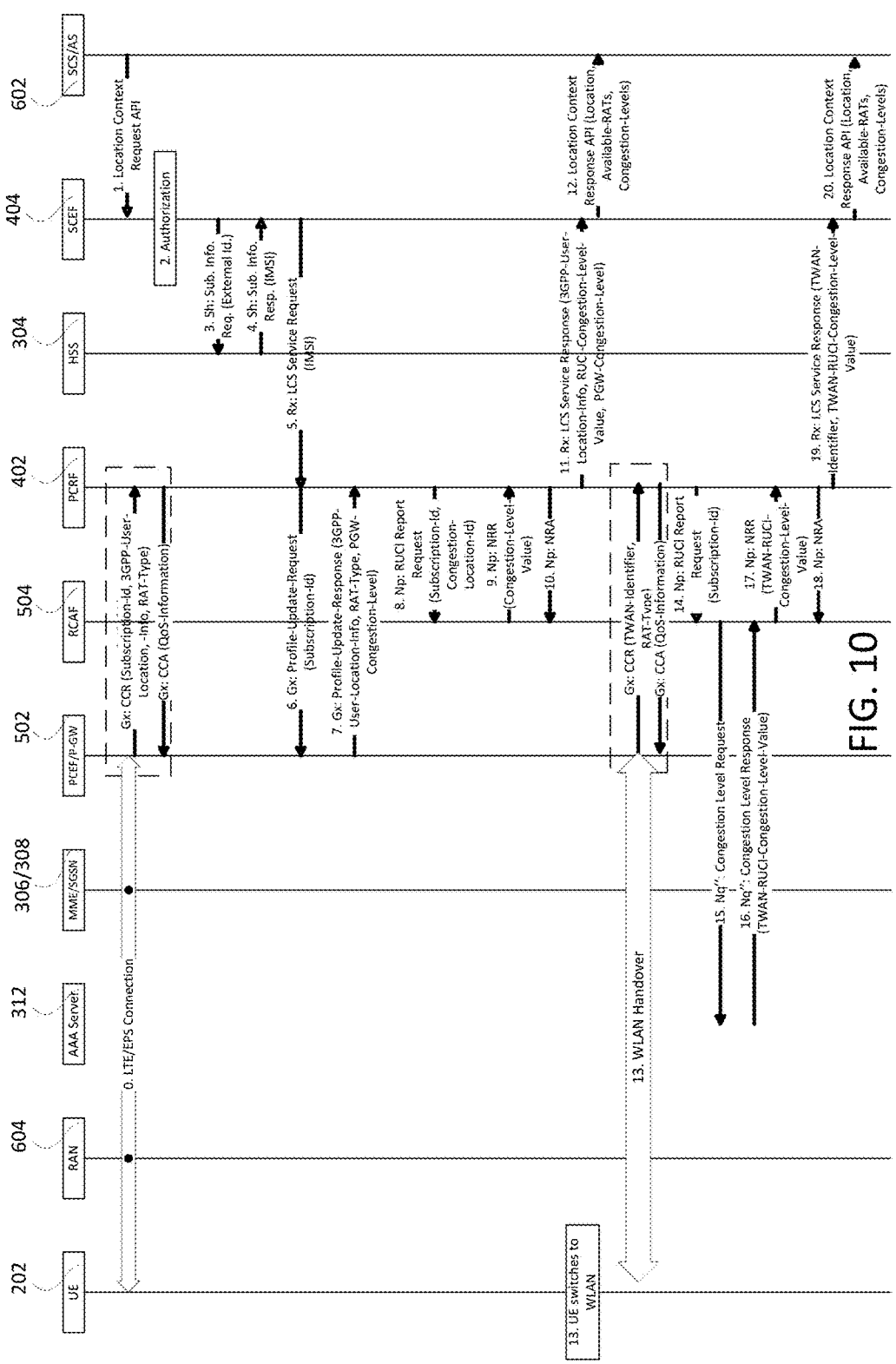
FIG. 10 is a diagram that illustrates a PCRF-based location context delivery procedure.

In step 0 of FIG. 10, initially, it is assumed that a UE 202 has an existing LTE data connection. Such connection was established using the initial attach procedure defined in clause 5.3.2. of TS 23.401 "General Packet Radio Service (GPRS) enhancements for Evolved Universal Terrestrial Radio Access Network (E-UTRAN) access," V12.4.0, March 2014. Of special interest in the attach procedure is the PCEF-initiated IP-CAN Session Establishment procedure (clause 7.2 of TS 23.203 "Policy and charging control architecture," V12.4.0, March 2014), between the P-GW (particularly, the PCEF 502) and the PCRF 402. In this procedure, the PCEF 502 requests PCC rules by sending "CC-Request (CCR)" (Subscription-Id, 3GPP-User-Location-Info, RAT-Type) message to the PCRF 402, over the Gx reference point. The 'Subscription-Id' is the identification of the subscription (e.g. IMSI, MSISDN), the '3GPP-User-Location-Info' AVP includes the user's location, and the 'RAT-Type=EUTRAN (1004)' AVP indicates type of the utilized RAT. In response, the PCRF 402 provisions PCC rules in the "CC-Answer (CCA)" (QoS-Information) message to the PCEF 502. The 'QoS-Information' indicates the authorized QoS of the UE's traffic. The complete AVPs of the CCR and CCA messages are listed in clauses 5.6.2 and 5.6.3 of TS 29.212 "Policy and Charging Control (PCC); Reference points," V12.4.0, March 2014.

Steps 1-4 of FIG. 10 are similar to steps 1-4 of FIG. 7.

In step 5 of FIG. 10, as the SCEF 404 has received the API request from the SCS/AS 602, authorized it, and obtained the UE's IMSI, the SCEF 404 sends a "LCS Service Request" (IMSI) message to the PCRF 402.

The SCEF 404 can send "LCS Service Request" (IMSI or External Identifier) to the PCRF 402 over the Rx reference point.

In step 6 of FIG. 10, in order for the PCRF 402 to acquire any updated information about the UE 202, it sends a "Profile-Update-Request" message to the PCEF 502.

A new message "Profile-Update-Request" can be defined from the PCRF 402 to the PCEF 502, over the Gx reference point.

Alternatively and if No PCRF 402 is deployed, step 5 and 6 can be replaced by having direct connection between the SCEF 404 and PCEF 502. In this case, the PCEF 502 sends a new message "LCS Service Request" to the P-GW.

In step 7 of FIG. 10, in response, the PCEF 502 replies with a "Profile Update Response" (3GPP-User-Location-Info, RAT-Type, PGW-Congestion) message to the PCRF 402. If no PCRF 402 is deployed, then the PCEF 502 replies directly to the SCEF 404 with the "Profile Update Response" message.

A new message "Profile Update Response" (3GPP-User-Location-Info, RAT-Type, PGW-Congestion) can be sent from the PCEF 502 to the PCRF 402, over the Gx reference point. The '3GPP-User-Location-Info' AVP indicates the current UE's location, the 'RAT-Type' AVP indicates the current RAT, and the 'PGW-Congestion' AVP indicates the congestion level at the P-GW. As indicated in clause 4.3.7.5 of TS 23.401, the P-GW can estimate its congestion level using the maximum number of active bearers per APN and/or the maximum rate of bearer activations per APN. This congestion level will be included in the 'PGW-Congestion' AVP.

In step 8 of FIG. 10, once the PCRF 402 gets the congestion level at the P-GW, it can also gets the congestion level at the RAN user plane. In particular, the PCRF 402 can contact the RCAF 504 over the Np reference point (TS 29.217) to inquire about the RAN User Plane Congestion Information (RUCI).

A new message "RUCI Report Request" (Subscription-Id, Congestion-Location-Id) message can be sent from the PCRF 402 to the RCAF 504 over the Np reference point. The PCRF 402 includes the 'Congestion-Location-Id' AVP to indicate its interest in the congestion level at that particular location. The 'Congestion-Location-Id' AVP includes 3GPP-User-Location-Info and eNodeB-ID, as defined in clause 5.3.9 of TS 29.217. Also, the PCRF 402 includes the user id within the 'Subscription-Id' AVP. Both of these AVPs were defined previously in TS 29.217, and are utilized here in the new message "RUCI Report Request".

Alternatively and if No PCRF 402 is deployed, the SCEF 404 can send the "RUCI Report Request" message directly to the RCAF 504.

In step 9 of FIG. 10, in response, RCAF 504 sends "Non-Aggregated-RUCI-Report-Request (NRR)" (Congestion-Level-Value, Subscription-Id, Congestion-Location-Id) message to the PCRF 402 over the Np reference point (clause 5.6.1 of TS 29.217). The 'Congestion-Level-Value' AVP indicates the congestion level of the cell where the UE 202 is located (clause 5.3.6 of TS 29.217).

In step 10 of FIG. 10, once the PCRF 402 gets the RUCI report from the RCAF 504, it sends "Non-Aggregated-RUCI-Report-Answer (NRA)" (clause 5.6.2 of TS 29.217) over the Np reference point.

In step 11 of FIG. 10, the PCRF 402 sends the "LCS Service Response" (3GPP-User-Location-Info, RUCI-Congestion-Level-Value, PGW-Congestion) message to the SCEF 404 over the Rx reference point.

A new message "LCS Service Response" (3GPP-User-Location-Info, RUCI-Congestion-Level-Value, PGW-Congestion) can be sent from the PCRF 402 to the SCEF 404 over the Rx reference point. The 'RUCI-Congestion-Level-Value' AVP equals the 'Congestion-Level-Value' received from the RCAF 504 in step 9.

In step 12 of FIG. 10, the SCEF 404 can send a "Location Context Response" (Location, Available-RATs, Congestion-Levels) API to the SCS/AS 602 carrying the UE's context information. The 'Congestion-Levels' AVP will include the 'PGW-Congestion' and 'RUCI-Congestion-Level-Value' AVPs.

In step 13 of FIG. 10, it is assumed that the UE 202 decides to switch to Wi-Fi via a trusted WLAN (TWAN), the inter-RAT handover procedure from LTE to WLAN, defined in clause 16.10.1.1. of TS 23.402 "Architecture enhancements for non-3GPP accesses," V12.4.0, March 2014, will be executed. The PCEF-initiated IP-CAN Session Modification procedure will be executed as a part of the handover procedure. During the IP-CAN procedure, the PCEF 502 sends "CC-Request (CCR)" (RAT-Type, TWAN-Identifier) message (clause 5.6.2 of TS 29.212) to the PCRF 402 over the Gx reference point to request updated PCC rules. The RAT-Type=WLAN indicates the new RAT and the 'TWAN-Identifier' AVP indicates the UE 202 location in the TWAN. In response, the PCRF 402 provides the PCC rules including 'QoS-Information' in the "CC-Answer (CCA)" (QoS-Information) message (clause 5.6.3 of TS 29.212) to the PCEF 502 over the Gx reference point.

In step 14 of FIG. 10, once the PCRF 402 is updated with the RAT change via the IP-CAN Session Modification procedure in the above step, it aims to inquire about the congestion status at the TWAN by sending the "RUCI Report Request" (Subscription-Id) message to the RCAF 504, as described in Step 8.

In step 15 of FIG. 10, in response, the RCAF 504 sends "Congestion Level Request" message to the 3GPP AAA Server 312 over the newly-introduced Nq" reference point. The naming of this newly introduced reference point follows the Nq (MME-RCAF, clause 4.4.12 of TS 23.401) and Nq' (SGSN-RCAF, clause 5.4.11 of TS 23.060 "General Packet Radio Service (GPRS), Stage 2".).

In step 16 of FIG. 10, consequently, the 3GPP AAA Server 312 can send "Congestion Level Response" (TWAN-RUCI-Congestion-Level-Value) message to the RCAF 504, over the newly-introduced Nq" reference point. The 'TWAN-RUCI-Congestion-Level-Value' AVP carries the congestion level at the TWAN.

Steps 17-20 of FIG. 10 are similar to steps 9-12, carrying the 'TWAN-RUCI-Congestion-Level-Value' for the TWAN RAN congestion level, 'TWAN-Identifier' for UE's location in the TWAN, and 'MILAN' for available RATs.

It is understood that the entities performing the steps illustrated in FIG. 10 may be logical entities that may be implemented in the form of software (i.e., computer-executable instructions) stored in a memory of, and executing on a processor of, an apparatus configured for wireless and/or network communications or a computer system such as those illustrated in FIG. 14C or FIG. 14D. That is, the method(s) illustrated in FIG. 10 may be implemented in the form of software (i.e., computer-executable instructions) stored in a memory of an apparatus, such as the apparatus or computer system illustrated in FIG. 14C or FIG. 14D, which computer executable instructions, when executed by a processor of the apparatus, perform the steps illustrated in FIG. 10. It is also understood that the functionality illustrated in FIG. 10 may implemented as a set of virtualized network functions. The network functions may not necessarily communicate directly, rather, they may communicate via forwarding or routing function. It is also understood that any transmitting and receiving steps illustrated in FIG. 10 may be performed by communication circuitry of the apparatus under control of the processor of the apparatus and the computer-executable instructions (e.g., software) that it executes.

SCEF-Initiated Location Context Request Procedure

Figure 11:
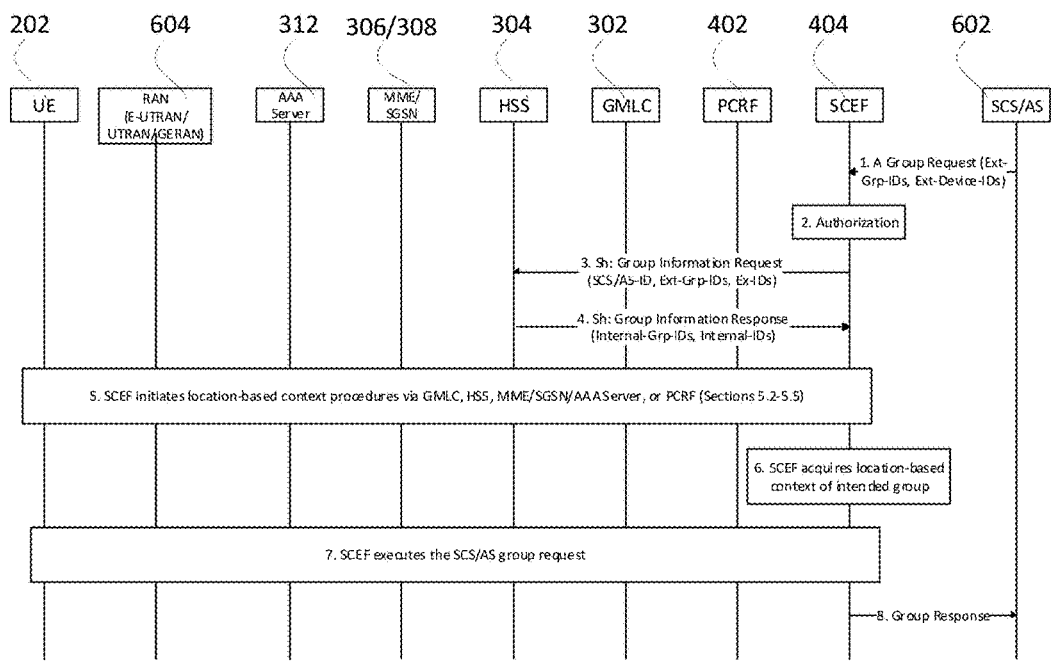
FIG. 11 is a diagram that illustrates an SCEF-initiated location context request for group communication.

In embodiments discussed above, it is assumed that the SCS/AS 602 initiates the inquiry about a particular UE's location-based context. Alternatively, the SCEF 404 may be the node initiating such location-based context request as a part of another procedure. For example, group-based enhancement (GROUPE) is currently being studied in 3GPP TR 23.769 "Group based Enhancements (GROUPE)". One of the key issues of GROUPE is the selection of delivery mechanisms for messaging to a group (clause 5.2 of 3GPP TR 23.769). For instance, the availability of message delivery mechanisms (e.g. MBMS) and radio access technology within the geographic area, where the message needs to be delivered, needs to be taken into consideration (clause 5.2 of 3GPP TR 23.769). Such information is part of the location-based context, as discussed earlier. In this case, once the SCEF 404 receives a particular group request from the SCS/AS 602, it decides to initiate any of the location context delivery procedures to know about the group's context before executing the group request. FIG. 11 explains such procedure.

The call flow in FIG. 11 can be explained as follows.

In step 0 of FIG. 11, the SCS/AS 602 sends a particular Group Request (e.g. data delivery) to the SCEF 404. The group is identified by its External-Group-ID and the individual UEs are identified by their External-Device-IDs.

In step 1 of FIG. 11, the SCEF 404 verified that the SCS/AS 602 is authorized to send such group request.

In step 2 of FIG. 11, once authorized, the SCEF 404 sends "Group Information Request" (SCS/AS-ID, External-Group-ID, External-IDs) to the HSS 304 over the Sh reference point, as indicated in clause 5.5.3 of 3GPP TR 23.769.

In step 3 of FIG. 11, in response, the HSS 304 sends "Group Information Response" (Internal-Group-ID, Internal-IDs) to the SCEF 404.

In step 4 of FIG. 11, before the SCEF 404 forwards the group request to the intended core network node (e.g. BM-SC), the SCEF 404 inquires about the location-based context of this group of UEs. Hence, it executes one of the context delivery procedures, described above. The SCEF 404 can make more than one inquiry to find the location of each group member.

In step 5 of FIG. 11, as a result, the SCEF 404 acquires the location-based context (location, available RATs, congestion levels) of the group under consideration.

In step 6 of FIG. 11, based on the received context, the SCEF 404 will be able to choose the best available method to execute the group request such as Multimedia Broadcast Multicast Service (MBMS), Cell Broadcast Service (CBS), or Short Message Service (SMS).

In step 7 of FIG. 11, finally and once the group request is executed, the SCEF 404 sends "Group Response" message to the SCS/AS 602.

It is understood that the entities performing the steps illustrated in FIG. 11 may be logical entities that may be implemented in the form of software (i.e., computer-executable instructions) stored in a memory of, and executing on a processor of, an apparatus configured for wireless and/or network communications or a computer system such as those illustrated in FIG. 14C or FIG. 14D. That is, the method(s) illustrated in FIG. 11 may be implemented in the form of software (i.e., computer-executable instructions) stored in a memory of an apparatus, such as the apparatus or computer system illustrated in FIG. 14C or FIG. 14D, which computer executable instructions, when executed by a processor of the apparatus, perform the steps illustrated in FIG. 11. It is also understood that the functionality illustrated in FIG. 11 may implemented as a set of virtualized network functions. The network functions may not necessarily communicate directly, rather, they may communicate via forwarding or routing function. It is also understood that any transmitting and receiving steps illustrated in FIG. 11 may be performed by communication circuitry of the apparatus under control of the processor of the apparatus and the computer-executable instructions (e.g., software) that it executes.

Protocol Embodiments: Messages Extensions

In this section, the protocol embodiments covering the detailed message extensions are described. More precisely, the needed message and protocol extensions to enable the procedures described above are introduced.

GMLC-Associated Reference Points

The GMLC 302 has been utilized in the GMLC-based location context delivery procedure, described in FIG. 7. In this section, only the new and modified messages, along with the new information elements carried over its associated reference points (SLg/Lg, La, Le) are described.

SLg/Lg Reference Point (GMLC-MME/SGSN)

In steps 8 and 11 of FIG. 7, the GMLC 302 communicates with the MME 306/SGSN 308 over the SLg/Lg reference point using two modified messages, which are Provide-Location-Request (PLR) and Provide-Location-Answer (PLA), respectively. In this section, the information elements of these two messages, including the new ones.

SLg/Lg: Provide-Location-Request (PLR) Command (FIG. 7, step 8) are described.

The Provide-Location-Request (PLR) command, indicated by the Command-Code field set to 8388620 and the 'R' bit set in the Command Flags field, is sent by the GMLC 302 in order to request subscriber location to the MME 306 or SGSN 308 (clause 7.3.1 of TS 29.172).

The new 'Congestion-Level-Requested' IE can be included in the PLR message to indicate the GMLC's desire to know the congestion levels at the MME 306/SGSN 308. The updated Message Format is:

```
< Provide-Location-Request> ::= < Diameter Header: 8388620, REQ,
PXY, 16777255 >
                    < Session-Id >
                    [ Vendor-Specific-Application-Id ]
                    { Auth-Session-State }
                    { Origin-Host }
                    { Origin-Realm }
                    {Destination-Host }
                    { Destination-Realm }
                    { Location-Type }
                    [ User-Name ]
                    [ MSISDN]
                    [ IMEI ]
                    { LCS-EPS-Client-Name }
                    { LCS-Client-Type }
                    [ LCS-Requestor-Name ]
                    [ LCS-Priority ]
                    [ LCS-QoS ]
                    [ Velocity-Requested ]
                    [LCS-Supported-GAD-Shapes ]
                    [ LCS-Service-Type-ID ]
                    [ LCS-Codeword ]
                    [ LCS-Privacy-Check-Non-Session ]
                    [ LCS-Privacy-Check-Session ]
                    [Service-Selection ]
                    [ Deferred-Location-Type ]
                    [ PLR-Flags ]
                    *[ Supported-Features ]
                    *[ AVP ]
                    *[ Proxy-Info ]
                    *[ Route-Record ]
                    *[ Congestion-Level-Requested ]
```

SLg/Lg: Provide-Location-Answer (PLA) Command (FIG. 7, Step 11)

The modified Provide-Location-Answer (PLA) command, indicated by the Command-Code field set to 8388620 and the 'R' bit cleared in the Command Flags field, is sent by the MME 306 or SGSN 308 to the GMLC 302 in response to the PLR command (clause 7.3.2 of TS 29.172).

New 'MME-Congestion-Level' and 'SGSN-Congestion-Level' IEs can be included in the PLA message, which will include the congestion levels at the MME 306 and SGSN 308. Also, the existing 'E-UTRAN-Positioning-Data', 'UTRAN-Positioning-Data', and 'GERAN-Positioning-Data' IEs can be used to know if the UE 202 has access to E-UTRAN, UTRAN, and/or GREAN RATs, respectively. The updated Message Format is:

```
< Provide-Location-Answer > ::= < Diameter Header: 8388620, PXY,
16777255 >
                    < Session-Id >
                    [ Vendor-Specific-Application-Id ]
                    [ Result-Code ]
                    [ Experimental-Result ]
                    { Auth-Session-State }
                    { Origin-Host }
                    { Origin-Realm }
                    [ Location-Estimate ]
                    [ Accuracy-Fulfilment-Indicator ]
                    [ Age-Of-Location-Estimate]
                    [ Velocity-Estimate ]
                    [ EUTRAN-Positioning-Data]
                    [ ECGI ]
                    [ GERAN-Positioning-Info ]
                    [ Cell-Global-Identity ]
                    [ UTRAN-Positioning-Info ]
                    [ Service-Area-Identity ]
                    [ Serving-Node ]
                    [ PLA-Flags ]
                    [ ESMLC-Cell-Info ]
                    *[ Supported-Features ]
                    *[ AVP ]
                    *[ Failed-AVP ]
                    *[ Proxy-Info ]
                    *[ Route-Record]
                    *[ MME-Congestion-Level]
                    *[ SGSN-Congestion-Level]
```

La Reference Point (GMLC-3GPP AAA Server 312)

The La reference point was introduced for I-WLAN in TS 23.271 "Functional stage 2 description of Location Services (LCS)". Furthermore in TS 23.271 clause 9.1.13, an IW-MT-LR (Mobile Terminated Location Request for an I-WLAN) procedure is described, in which the GMLC 302 communicates with the 3GPP AAA Server 312 to get the UE location. It sends "UE Routing Info Inquiry" message to the 3GPP AAA Server 312. In response, the AAA Server 312 replies with "UE Routing Info Inquiry Ack" message. In steps 12 and 14 of FIG. 7, the GMLC 302 can communicate with the 3GPP AAA Server 312 over the La reference point using updated version of these two messages.

There is no stage-3 definition of these two La messages. The only description of them is in the IW-MT-LR procedure (clause 9.1.13 of stage-2 TS 23.271). Using this Stage-2 description, a limited number of information elements are mentioned. The included information elements will follow the ones described above (GMLC-MME 306/SGSN 308).

La: UE Routing Info Inquiry Command (FIG. 7, Step 12)

The modified UE Routing Info Inquiry message is sent from the GMLC 302 to the 3GPP AAA Server 312 to inquire about the UE's location and congestion. The new 'Congestion-Level-Requested' IE can be included in the modified "UE Routing Info Inquiry" message to inquire about the congestion level at the 3GPP AAA Server 312. The message format is:

```
< UE Routing Info Inquiry > ::= < Diameter Header: TBD>
                    < Session-Id >
                    [ Vendor-Specific-Application-Id ]
                    { Auth-Session-State }
                    { Origin-Host }
                    { Origin-Realm }
                    {Destination-Host }
                    { Destination-Realm }
                    { Location-Type }
                    [ User-Name ]
                    [ MSISDN]
                    [ IMEI ]
                    { LCS-EPS-Client-Name }
                    { LCS-Client-Type }
                    [ LCS-Requestor-Name ]
                    [ LCS-Priority ]
                    [ LCS-QoS ]
                    [ Velocity-Requested ]
                    [LCS-Supported-GAD-Shapes ]
                    [ LCS-Service-Type-ID ]
                    [ LCS-Codeword ]
                    [ LCS-Privacy-Check-Non-Session ]
                    [ LCS-Privacy-Check-Session ]
                    [Service-Selection ]
                    [ Deferred-Location-Type ]
                    [ Flags ]
                    *[ Supported-Features ]
                    *[ AVP ]
                    *[ Proxy-Info ]
                    *[ Route-Record ]
                    *[ Congestion-Level-Requested ]
```

La: UE Routing Info Inquiry Ack Command (FIG. 7, Step 14)

The modified UE Routing Info Inquiry Ack message is sent from the 3GPP AAA Server 312 to the GMLC 302 to indicate the UE's location and congestion. The new 'AAA-Congestion-Level' IE can be included in the modified "UE Routing Info Inquiry Ack" message to include the congestion level at the 3GPP AAA Server 312. The new 'MILAN-Positioning-Data' IE will carry the UE's location and the 'LIE-Reachable' will indicate if the UE 202 is reachable via Wi-Fi or not. The message format, similar to the PLA, is

```
< UE Routing Info Inquiry Ack > ::=   < Diameter Header: TBD >
                    < Session-Id >
                    [ Vendor-Specific-Application-Id ]
                    [ Result-Code ]
                    [ Experimental-Result ]
                    { Auth-Session-State }
                    { Origin-Host }
                    { Origin-Realm }
                    [ Location-Estimate ]
                    [ Accuracy-Fulfilment-Indicator ]
                    [ Age-Of-Location-Estimate]
                    [ Velocity-Estimate ]
                    [ ECGI ]
                    [ Cell-Global-Identity ]
                    [ UTRAN-Positioning-Info ]
                    [ Service-Area-Identity ]
                    [ Serving-Node ]
                    [Flags ]
                    [ ESMLC-Cell-Info ]
                    *[ Supported-Features ]
                    *[ AVP ]
                    *[ Failed-AVP ]
                    *[ Proxy-Info ]
                    *[ Route-Record]
                    *[UE-Reachable]
                    *[ WLAN-Positioning-Data]
                    *[ AAA-Congestion-Level]
```

Le Reference Point (GMLC-SCEF)

The Le reference point is utilized in TS 23.271 clause 9.1.1 to carry the "LCS Service Request" and "LCS Service Response" messages. As indicated in TS 23.002 "Network architecture", "the Le interface is used by the external LCS client to retrieve location information from the LCS server. Signalling on this interface may use the OMA Mobile Location Protocol (MLP) and Open Service Access Application Programming Interface (OSA-API), TS 29.198".

Le: LCS Service Response (FIG. 7, Step 16)

New IEs 'Available-RATs' and 'Congestion-Levels' can be included to the "LCS Service Response" to convey the complete UE's location context. So, the GMLC 302 will send the "LCS Service Response" (Location, Velocity, Available-RATs, Congestion-Levels) message to the SCEF 404 over the Le reference point.

HSS-Associated Reference Points

The HSS 304 has been utilized in the HSS-based location context delivery procedure, described in FIG. 8. In this section, only the new and modified messages, along with the new information elements carried over its associated reference points (Sh, S6a/S6d, SWx), are presented.

S6a/S6d Reference Point (HSS-MME/SGSN)

In steps 4 and 7 of FIG. 8, the HSS 304 communicates with the MME 306/SGSN 308 over the S6a/S6d reference point using two new messages, which are User-Location-Request and User-Location-Response, respectively. The complete messages and information elements over S6a/S6d reference point are included in TS 29.272. Typical AVPs, found in TS 29.272, are added to these messages. In this section, the new information elements of these two messages are presented.

S6a/S6d: User-Location-Request (FIG. 8, Step 4)

The HSS 304 can send a new "User-Location-Request" (IMSI, Congestion-Level-Requested) message to the MME 306/SGSN 308 over the S6a/S6d reference point. The 'Congestion-Level-Requested' AVP indicate the HSS's desire to know the congestion level at the MME 306/SGSN 308 serving nodes. The message format is

```
< User-Location-Request > ::=    < Diameter Header: TBD>
                                 < Session-Id >
                                 [ Vendor-Specific-Application-Id ]
                                 { Auth-Session-State }
                                 { Origin-Host }
                                 { Origin-Realm }
                                 { Destination-Host }
                                 { Destination-Realm }
                                 { User-Name }
                                 *[Supported-Features ]
                                 [Flags ]
                                 *[ AVP ]
                                 *[ Proxy-Info ]
                                 *[ Route-Record ]
                                 { Congestion-Level-Requested }
```

S6a/S6d: User-Location-Response (FIG. 8, Step 7)

The MME 306/SGSN 308 can send a new "User-Location-Response" (EPS-Location-Information, MME-Congestion-Level, SGSN-Congestion-Level) message to the HSS 304 over the S6a/S6d reference point. Furthermore, the new 'MME-Congestion-Level' and 'SGSN-Congestion-Level' AVPs can be used. The message format is

```
< User-Location-Response > ::= < Diameter Header: TBD>
                               < Session-Id >
                               [ Vendor-Specific-Application-Id ]
                               *[ Supported-Features ]
                               [ Result-Code ]
                               [ Experimental-Result ]
                               { Auth-Session-State }
                               { Origin-Host }
                               { Origin-Realm }
                               [ IMS-Voice-Over-PS-Sessions-Supported ]
                               [ Last-UE-Activity-Time ]
                               [ RAT-Type ]
                               [Flags ]
                               [ EPS-User-State ]
                               [ EPS-Location-Information ]
                               [Local-Time-Zone ]
                               *[ AVP ]
                               *[ Failed-AVP ]
                               *[ Proxy-Info ]
                               *[ Route-Record ]
                               { MME-Congestion-Level}
                               { SGSN-Congestion-Level' }
```

SWx Reference Point (HSS-3GPP AAA Server)

In steps 8 and 10 of FIG. 8, the HSS 304 communicates with the 3GPP AAA Server 312 over the SWx reference point using two modified messages, which are "User-Profile-Update-Request" and "User-Profile-Update-Response", respectively. The complete messages and information elements over SWx reference point are included in TS 29.272. Typical AVPs, found in TS 29.272, are added to these messages. In this section, the new information elements of these two messages are presented.

SWx: User-Profile-Update-Request (FIG. 8, Step 8)

The HSS 304 can send a modified "User-Profile-Update-Request" (IMSI, Access-Network-Info-Request, Congestion-Request) message to the 3GPP AAA Server 312 over the SWx reference point. The 'Congestion-Request' indicates the HSS's desire to be informed about the congestion level at the 3GPP AAA Server. Table 1 (copied from TS 29.273 "Evolved Packet System (EPS); 3GPP EPS AAA interfaces") shows the IEs of the "User-Profile-Update-Request" message and Table 2 (default is copied from TS 29.273) shows its Push-Profile-Request (PPR) flags. The 'Congestion-Request' IE can be included in the "User-Profile-Update-Request" message IEs or in the PPR-flags. As an example, the 'Congestion-Request' IE is added to Table 2. The PPR-Flags AVP is of type Unsigned32 and it contains a bit mask. The meanings of the bits are as defined in Table 2.

TABLE 1

User Profile Update request (TS 29.273)

| Information element name | Mapping to Diameter AVP | Cat. | Description |
|---|---|---|---|
| IMSI | User-Name (See IETF RFC 3588) | M | This information element shall contain the user IMSI and shall be formatted according to 3GPP TS 23.003 "Numbering, addressing and identification (Release 12)," V12.4.1., clause 2.2. |

TABLE 1-continued

User Profile Update request (TS 29.273)

| Information element name | Mapping to Diameter AVP | Cat. | Description |
|---|---|---|---|
| User profile | Non-3GPP-User-Data | M | This IE shall contain the updated user profile. Section 8.2.3.1 (of TS 29.273) details the contents of the AVP. In case of trace activation or deactivation, the Trace-Info AVP shall be included, and this may be the only AVP that is present under this grouped AVP. |
| Routing Information | Destination-Host | M | This IE shall contain the 3GPP AAA Server name that is obtained from the Origin-Host AVP, which is received from the 3GPP AAA Server 312 |
| PPR Flags | PPR-Flags | O | This Information Element contains a bit mask. See Table 2 for the meaning of the bits. |
| Supported Features (See 3GPP TS 29.229) | Supported-Features | O | If present, this information element shall contain the list of features supported by the origin host. |

TABLE 2

PPR-Flags

| Bit | Name | Description |
|---|---|---|
| 0 | Reset-Indication | This bit, when set, indicates that the HSS 304 has undergone a restart event and the registration data and dynamic data needs to be restored, if available at the 3GPP AAA Server 312. |
| 1 | Access-Network-Info-Request | This bit, when set, indicates that the HSS 304 requests the 3GPP AAA Server 312 the identity and location information of the access network where the UE 202 is currently attached. |
| 2 | UE-Local-Time-Zone-Request | This bit, when set, indicates that the HSS 304 requests the 3GPP AAA Server 312 the time zone of the location in the access network where the UE 202 is attached. |
| 3 | Congestion-Request | This bit, when set, indicates that the HSS 304 requests the 3GPP AAA Server 312 the congestion level of the access network where the UE 202 is currently attached. |

NOTE:
Bits not defined in this table shall be cleared by the sending HSS 304 and discarded by the receiving 3GPP AAA Server 312.

SWx: User-Profile-Update-Response (FIG. 8, Step 10)

The 3GPP AAA Server 312 can send a modified "User-Profile-Update-Response" (Access-Network-Info, AAA-Congestion-Level) message to the HSS 304 over the SWx reference point. The new 'AAA-Congestion-Level' AVP provides the congestion level at the access network, where the UE 202 is attached.

TABLE 3

User Profile Update response

| Information element name | Mapping to Diameter AVP | Cat. | Description |
|---|---|---|---|
| Result | Result-Code/Experimental-Result | M | This IE shall contain the result of the operation. The Result-Code AVP shall be used for errors defined in the Diameter Base Protocol. The Experimental-Result AVP shall be used for SWx errors. This is a grouped AVP which shall contain the 3GPP Vendor ID in the Vendor-Id AVP, and the error code in the Experimental-Result-Code AVP. |
| Access Network Information | Access-Network-Info | O | If present, this IE shall contain the identity and location information of the access network where the UE 202 is attached. |
| Local Time Zone | Local-Time-Zone | O | If present, this IE shall contain the time zone of the location in the access network where the UE 202 is attached. |
| Supported Features (See 3GPP TS 29.229) | Supported-Features | O | If present, this information element shall contain the list of features supported by the origin host. |
| AAA Congestion Level | AAA-Congestion-Level | O | If present, this IE shall contain the congestion level of the access network where the UE 202 is attached. |

Sh Reference Point (HSS-SCEF)

In steps 3 and 11 of FIG. 8 the HSS 304 can communicate with the SCEF 404 over the Sh reference point using two new messages, which are "LCS Service Request" and "LCS Service Response", respectively. Similar to the Le reference point, signaling on this interface may use the OMA Mobile Location Protocol (MLP) and Open Service Access Application Programming Interface (OSA-API), TS 29.198. In this section, the new information elements of these two messages is presented.

Sh: LCS Service Request (FIG. 8, Step 3)

The SCEF 404 can send a new "LCS Service Request" (External Identifier) message to the HSS 304 over the Sh reference point.

Sh: LCS Service Response (FIG. 8, Step 11)

The HSS 304 can send a new LCS Service Response (EPS-Location-Information, Access-Network-Info, MME-Congestion-Level, SGSN-Congestion-Level, AAA-Congestion-Level) message to the SCEF 404 over the Sh reference point. This message carries all the location and congestion AVPs received previously from the MME 306/SGSN 308 and 3GPP AAA Server 312, which were described earlier in Sections 6.1.2.1.2 and 6.1.2.2.2.

SCEF-Associated Reference Points

The SCEF 404 has been utilized in the SCEF-based location context delivery procedure, described in FIG. 9. In this section, only the new and modified messages, along with the new information elements carried over its associated reference points (T5b'/T5a', T5w'), are presented.

T5b'/T5a' Reference Point (SCEF-MME/SGSN) (FIG. 9, Steps 5 and 8)

In steps 5 and 8 of FIG. 9, the SCEF 404 communicates with the MME 306/SGSN 308 over the T5b'/T5a' reference point using two new messages, which are User-Location-Request and User-Location-Response, respectively. The message format and IEs of these two messages are similar to their corresponding ones over the S6a/S6d.

T5w Reference Point (SCEF-3GPP AAA Server) (FIG. 9, Steps 9 and 11)

In steps 9 and 11 of FIG. 9, the SCEF 404 communicates with the 3GPP AAA Server 312 over the new T5w reference point using two new messages, which are "User-Profile-Update-Request" and "User-Profile-Update-Response", respectively. The message format and IEs of these two messages are similar to their corresponding ones over the SWx, described above.

API to SCS/AS 602

In the first step of all of the solutions discussed above, the SCEF 404 can expose "Location Context Request API" to the SCS/AS 602. In the end of every solution, the SCEF 404 responds back to the SCEF 404 by sending "Location Context Request API" (Location, Velocity, Available-RATs, Congestion-Levels) API carrying the UE's context information to the SCS/AS 602.

PCRF-Associated Reference Points

The PCRF 402 has been utilized in the PCRF 402-based location context delivery procedure, described in FIG. 10. In this section, only the new and modified messages, along with the new information elements carried over its associated reference points (Gx, Rx), are presented.

Gx Reference Point (PCRF-PCEF)

In steps 6 and 7 of FIG. 10, the PCRF 402 communicates with the PCEF 502 (at the P-GW) over the Gx reference point using two new messages, which are Profile-Update-Request and Profile-Update-Response, respectively. The complete messages and information elements over Gx reference point are included in TS 29.212. Typical AVPs, found in TS 29.212, are added to these messages. In this section, the message format of these two messages is presented.

Gx: Profile-Update-Request (FIG. 10, Step 6)

A new message "Profile-Update-Request" can be sent from the PCRF 402 to the PCEF 502, over the Gx reference point. The message format is:

```
<Profile-Update-Request> ::= < Diameter Header: TBD >
    < Session-Id >
    { Origin-Host }
    { Origin-Realm }
    { Destination-Realm }
    { Destination-Host }
    [ Proxy-Info ]
    *[ Route-Record ]
    *[ AVP ]
```

Gx: Profile-Update-Response (FIG. 10, Step 7)

A new message "Profile-Update-Response" (3GPP-User-Location-Info, RAT-Type, PGW-Congestion-Level) can be sent from the PCEF 502 to the PCRF 402, over the Gx reference point. The '3GPP-User-Location-Info' AVP indicates the current UE's location, the 'RAT-Type' AVP indicates the current RAT, and the 'PGW-Congestion-Level' AVP indicates the congestion level at the P-GW. The message format is:

```
< Profile-Update-Response > ::= < Diameter Header: TBD>
    < Session-Id >
    { Origin-Host }
    { Origin-Realm }
    { Destination-Realm }
    *[ Subscription-Id ]
    [ IP-CAN-Type ]
    [ 3GPP-RAT-Type ]
    [ AN-Trusted ]
    [ RAT-Type ]
    [ QoS-Information ]
    [ 3GPP-User-Location-Info]
    [ User-Location-Info-Time ]
    [ User-CSG-Information ]
    [ TWAN-Identifier ]
    [ 3GPP-MS-TimeZone ]
    *[ Proxy-Info ]
    *[ Route-Record ]
    [PGW-Congestion-Level]
    *[ AVP ]
```

Rx Reference Point (PCRF-SCEF)

In steps 5, 11, and 19 of FIG. 10, the SCEF 404 can communicate with the PCRF 402 over the Rx reference point using two new messages, which are "LCS Service Request" and "LCS Service Response", respectively. Similar to the Le reference point, signalling on this interface may use the OMA Mobile Location Protocol (MLP) and Open Service Access Application Programming Interface (OSA-API), TS 29.198. In this section, the new information elements of these two messages are described.

Rx: LCS Service Request (FIG. 10, Step 5)

The SECF can send a new "LCS Service Request" (IMSI) message to the PCRF 402 over the Rx reference point.

Rx: LCS Service Response (FIG. 10, Steps 11, 19)

The PCRF 402 can send a new LCS Service Response (3GPP-User-Location-Info, TWAN-Identifier, RUCI-Congestion-Level-Value, TWAN-RUCI-Congestion-Level-Value, PGW-Congestion-Level) message to the SCEF 404 over the Rx reference point. This message carries all the location and congestion AVPs received from the P-GW and RCAF 504.

RCAF-Associated Reference Point

The RCAF 504 has been utilized in the PCRF-based location context delivery procedure, described in FIG. 10. In this section, only the new and modified messages, along with the new information elements carried over its associated reference points (Np, Nq"), are described.

Np Reference Point (RCAF-PCRF)

In steps 8, 9, 14, and 17 of FIG. 10, the RCAF 504 can communicate with the PCRF 402 over the Np reference point using new and modified messages, which are "RUCI Report Request" and "Non-Aggregated-RUCI-Report-Request (NRR)". The details of the Np reference point are indicated in TS 29.217. In this section, the new information elements of these two messages are described.

Np: RUCI Report Request (FIG. 10, Steps 8 and 14)

A new message "RUCI Report Request" (Subscription-Id, Congestion-Location-Id) message can be sent from the PCRF 402 to the RCAF 504 over the Np reference point. The 'Congestion-Location-Id' AVP includes 3GPP-User-Location-Info and eNodeB-ID, as defined in clause 5.3.9 of TS 29.217. Also, the PCRF 402 includes the user id within the 'Subscription-Id' AVP. Both of these AVPs were defined previously in TS 29.217, and are used here in the new message "RUCI Report Request".

Np: Non-Aggregated-RUCI-Report-Request (NRR) (FIG. 10, Steps 9 and 17)

The RCAF 504 sends "Non-Aggregated-RUCI-Report-Request (NRR)" (TWAN-RUCI-Congestion-Level-Value, Congestion-Level-Value, Subscription-Id, Congestion-Location-Id) message to the PCRF 402 over the Np reference point (clause 5.6.1 of TS 29.217). The 'Congestion-Level-Value' or 'TWAN-RUCI-Congestion-Level-Value' AVPs indicate the congestion level of the cell where the UE 202 is located (clause 5.3.6 of TS 29.217). The NRR command, indicated by the Command-Code field set to xxxxxx and the 'R' bit set in the Command Flags field, is sent by the RCAF 504 to the PCRF 402 as part of the Non-aggregated RUCI report procedure. The Message Format is:

```
< Non-Aggregated-RUCI-Report-Request> ::= <Diameter Header: TBD >
        < Session-Id >
        { Auth-Application-Id }
        { Auth-Session-State }
        { Origin-Host }
        { Origin-Realm }
        { Destination-Realm }
        [ Destination-Host ]
        [ Origin-State-Id ]
        [ Subscription-Id ]
        [ Called-Station-Id ]
        [ Congestion-Level-Value ]
        [ Congestion-Level-Set-Id ]
        [ Congestion-Location-Id ]
        [ RCAF-Id ]
        *[ Proxy-Info ]
        *[ Route-Record ]
        *[ Supported-Features ]
        *[ AVP ]
        [ TWAN-RUCI-Congestion-Level-Value ]
```

Nq" Reference Point (RCAF-3GPP AAA Server)

In steps 15 and 16 of FIG. 10, the RCAF 504 communicates with the 3GPP AAA Server 312 over the Nq" reference point using new messages, which are "Congestion Level Request" and "Congestion Level Response". First, the RCAF 504 sends "Congestion Level Request" message to the 3GPP AAA Server 312 over the newly-introduced Nq" reference point. In response, the 3GPP AAA Server 312 sends "Congestion Level Response" (TWAN-RUCI-Congestion-Level-Value) message to the RCAF 504, over the newly-introduced Nq" reference point. The 'TWAN-RUCI-Congestion-Level-Value' AVP carries the congestion level at the TWAN.

Graphical User Interface

Figure 12:
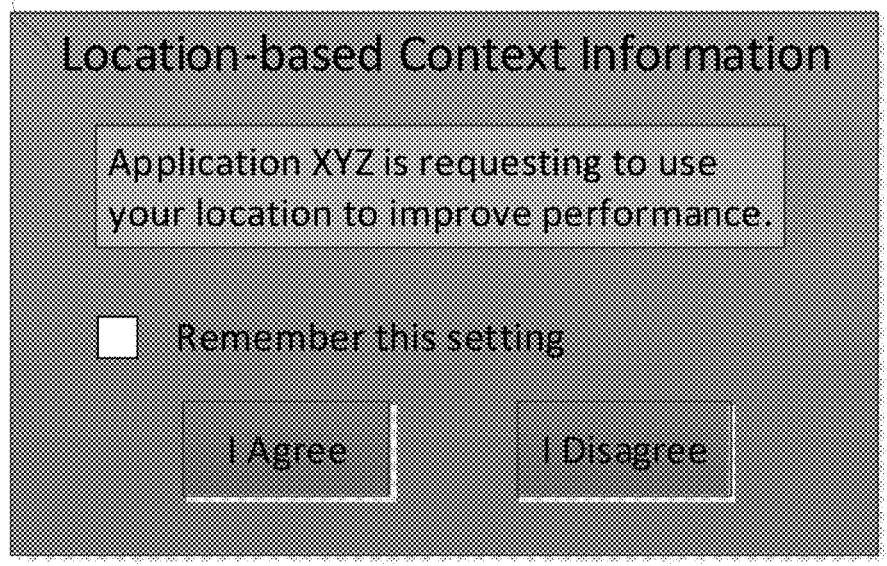
FIGS. 12-13 are diagrams of exemplary Graphical User Interfaces (GUIs).
Figure 13:
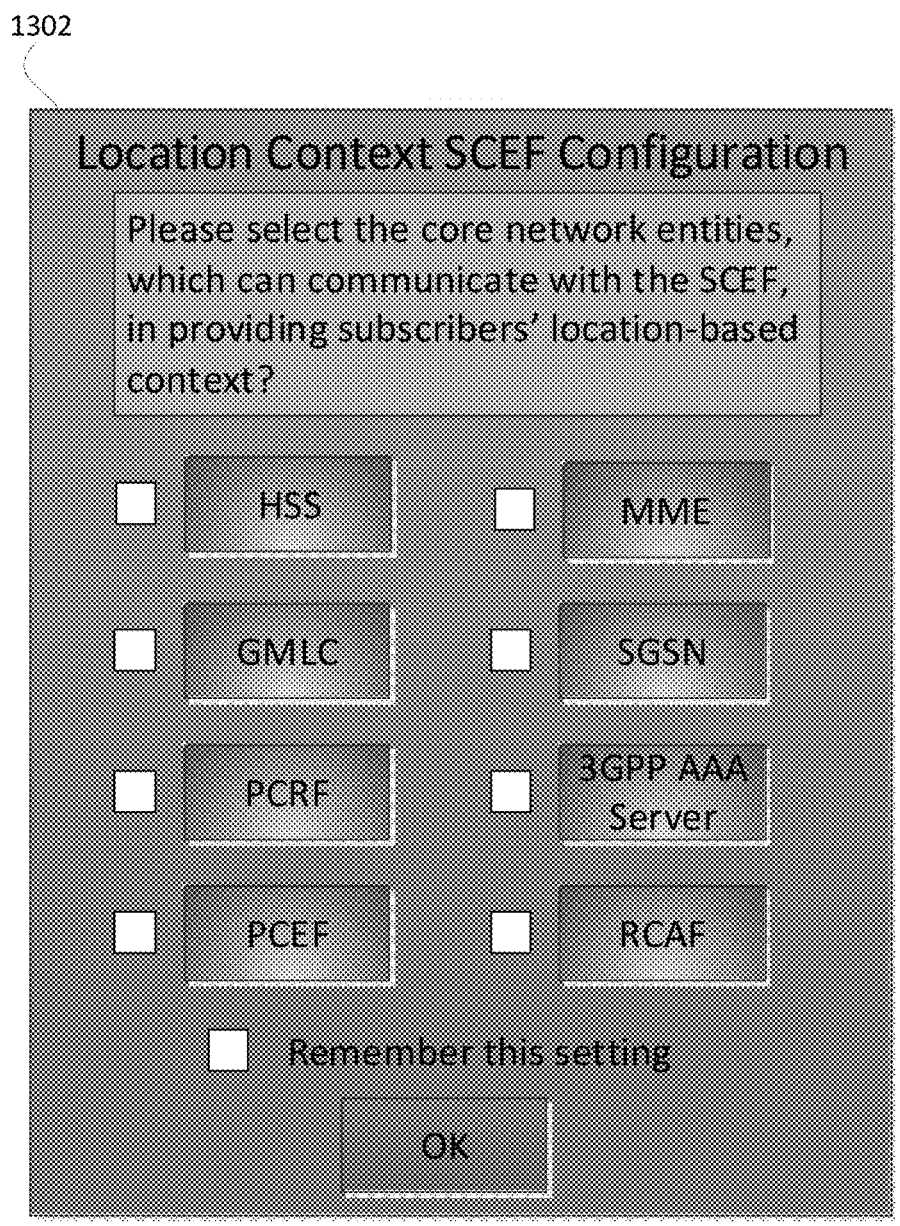

Interfaces, such as Graphical User Interfaces (GUIs), can be used to assist user to control and/or configure functionalities related to the service layer charging correlation. FIGS. 12 and 13 illustrate interfaces 1202 and 1302. It is to be understood that interfaces 1202 and 1302 can be produced using displays such as those shown in FIGS. 14C-D described below.

FIG. 12 depicts a Graphical User Interface (GUI) 1202 that allows the UE 202 to approve or disapprove the SCS/AS's request to access the UE's location context.

FIG. 13 shows a network configuration console 1302 that can be used by an operator to decide which core network entities are allowed to be involved in reporting the location-based context information. More specifically, the operator will configure the SCEF 404 and enable or disable its interaction with every potential network entity (e.g. MME 306, GMLC 302). The SCEF 404 entity is a good candidate to have such configuration console, as all the location requests in the disclosure are initiated by the SCEF 404. So, the SCEF 404 acts as a central point, through which an operator can configure all potential network nodes for location-context related requests.

FIG. 13 depicts the SCEF 404 configuration console 1302, which shows check boxes in front of all the potential involved network entities (e.g. GMLC 302, MME 306, P-GW, PCRF 402). Once the SCEF 404 is configured, it can only requests location-based context from the checked network nodes.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 14B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302. The M2M service layer 22 may be implemented by one or more servers, computers, devices, virtual machines (e.g. cloud/storage farms, etc.) or the like, including for example the devices illustrated in FIGS. 14C and 14D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 14B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302 may be hosted within a M2M service layer instance hosted by an M2M node, such as an M2M server, M2M gateway, or M2M device, as shown in FIG. 14B. For example, the logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 14C or FIG. 14D described below.

Further, logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302 can implemented as part of an M2M network that uses a Service Oriented Architecture (SOA) and/or a Resource-Oriented Architecture (ROA) to access services of the present application.

FIG. 14C is a block diagram of an example hardware/software architecture of a M2M network node 30, such as an M2M device 18, an M2M gateway 14, an M2M server, or the like. The node 30 can execute or include logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302. The device 30 can be part of an M2M network as shown in FIG. 14A-B or part of a non-M2M network. As shown in FIG. 14C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 14D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 14A and FIG. 14B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 14 A-B or the device 30 of FIG. 14C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as SCS/AS 602, SCEF 404, PCRF 402, PCEF 502, RCAF 504, HSS 304, GMLC 302, AAA Server 312, MME 306, SGSN 308, RAN 604 and UE 202 and logical entities to produce the user interfaces such as interfaces 1202 and 1302 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the node, cause the apparatus to:

receive a location context request from a server, wherein the location context request identifies a specific user equipment (UE) for which location context information is requested;

determine whether the server is authorized to obtain location context information of the specific UE;

in response to the location context request from the server, obtain the location context information that is specific to the UE from a core network node; and if the server is authorized to obtain location context information of the specific UE, provide the location context information to the server, wherein the location context information comprises congestion levels of one or more nodes that serve the UE, and the congestion levels comprise user plane congestion information or control plane congestion information.

2. The apparatus of claim 1, wherein the location context information further includes a current geographical location of the UE.

3. The apparatus of claim 1, wherein the location context information further includes information related to one or more Radio Access Technologies (RATs) that are available to the UE.

4. The apparatus of claim 1, wherein the core network node comprises at least one of a Gateway Mobile Location Center (GMLC), a Home Subscriber Server (HSS), a Policy and Charging Rules Function (PCRF), a Serving GPRS Support Node (SGSN), or a 3GPP Authentication, Authorization, and Accounting (AAA) Server.

5. The apparatus of claim 4, wherein the core network node comprises the PCRF that Policy obtains the location context information from the PCEF or the RCAF.

6. The apparatus of claim 1, wherein the apparatus is a Service Capability Exposure Function (SCEF).

7. A method performed by an apparatus, wherein the apparatus comprises a processor and memory, the method comprising:

receiving a location context request from a server, wherein the location context request identifies a specific user equipment (UE) for which location context information is requested;

determining whether the server is authorized to obtain location context information of the specific UE;

in response to the location context request from the server, obtaining the location context information that is specific to the UE from a core network node; and if the server is authorized to obtain location context information of the specific UE, providing the location context information to the server, wherein the location context information comprises congestion levels of one or more nodes that serve the UE, and the congestion levels comprise user plane congestion information or control plane congestion information.

8. The method of claim 7, wherein the apparatus is a Service Capability Exposure Function (SCEF).

9. An apparatus comprising a processor and a memory, the apparatus further including computer-executable instructions stored in the memory of the apparatus which, when executed by the processor of the node, cause the apparatus to:

receive a group message delivery request from a server, wherein the group message delivery request identifies a specific group of user equipments (UEs) for which location context information is requested;

determine whether the server is authorized to obtain location context information of the specific group of UEs;

if the group is authorized to obtain location context information of the specific group of UEs, in response to the group message delivery request from the server, obtain the location context information that is specific to UEs within the group from a core network node; and based on the location context information, determine a method for executing the group message delivery request, wherein the location context information comprises congestion levels of one or more nodes that serve the group, and the congestion levels comprise user plane congestion information of control plane congestion information.

10. The apparatus of claim 9, wherein the location context information further includes at least one of a location that is specific to UEs within the group, or information related to one or more Radio Access Technologies that are available to the group.

11. The apparatus of claim 9, wherein the apparatus is a Service Capability Exposure Function (SCEF).

* * * * *